(12) United States Patent
Steinberger et al.

(10) Patent No.: US 10,982,736 B2
(45) Date of Patent: Apr. 20, 2021

(54) MULTI-MODE ELECTROMECHANICAL VARIABLE TRANSMISSION

(71) Applicant: Oshkosh Corporation, Oshkosh, WI (US)

(72) Inventors: David J. Steinberger, Oshkosh, WI (US); Jon J. Morrow, Neenah, WI (US)

(73) Assignee: Oshkosh Corporation, Oshkosh, WI (US)

( * ) Notice: Subject to any disclaimer, the term of this patent is extended or adjusted under 35 U.S.C. 154(b) by 31 days.

(21) Appl. No.: 16/275,059

(22) Filed: Feb. 13, 2019

(65) Prior Publication Data

US 2019/0178350 A1 Jun. 13, 2019

Related U.S. Application Data

(63) Continuation-in-part of application No. 15/725,154, filed on Oct. 4, 2017, now Pat. No. 10,578,195, which
(Continued)

(51) Int. Cl.
*F16H 3/72* (2006.01)
*B60K 6/365* (2007.10)
(Continued)

(52) U.S. Cl.
CPC .............. *F16H 3/727* (2013.01); *B60K 6/365* (2013.01); *B60K 6/387* (2013.01); *B60K 6/442* (2013.01);
(Continued)

(58) Field of Classification Search
CPC ........ B60K 17/28; B60K 17/34; B60K 17/35; B60K 2006/381; B60K 2023/0858;
(Continued)

(56) References Cited

U.S. PATENT DOCUMENTS 1,951,089 A 3/1934 Fielder
3,524,069 A 8/1970 Stepanov et al.
(Continued)

FOREIGN PATENT DOCUMENTS

CN 101107460 1/2008
CN 101194114 A 6/2008
(Continued)

OTHER PUBLICATIONS

US 7,154,246 B1, 12/2006, Heap (withdrawn)
(Continued)

*Primary Examiner* — Derek D Knight
(74) *Attorney, Agent, or Firm* — Foley & Lardner LLP

(57) ABSTRACT

A drive system for a vehicle includes first and second electrical machines, a transmission, and an electrical energy supply. The transmission includes first and second gear sets, a connecting shaft coupled to the first gear set, a driveshaft configured to transport power from the electrical machines to a tractive element of the vehicle, and a clutch. The first gear set is coupled to the first electrical machine. The second gear set is coupled to the second electrical machine. Carriers of the first and second gear sets are coupled. The clutch selectively rotationally couples the carriers to the driveshaft when engaged. The drive system operates in an electric only configuration whereby the electrical energy supply provides electrical energy to at least one of the electrical machines to drive at least one of the connecting shaft and the driveshaft without a mechanical energy input to the transmission from an engine.

18 Claims, 15 Drawing Sheets

Related U.S. Application Data is a continuation-in-part of application No. 15/698,415, filed on Sep. 7, 2017, now abandoned, which is a continuation-in-part of application No. 15/693,176, filed on Aug. 31, 2017, now Pat. No. 10,584,775, which is a continuation-in-part of application No. 14/918,221, filed on Oct. 20, 2015, now Pat. No. 10,421,350, and a continuation-in-part of application No. 15/595,443, filed on May 15, 2017, now Pat. No. 9,970,515, which is a continuation of application No. 14/624,285, filed on Feb. 17, 2015, now Pat. No. 9,651,120, said application No. 15/693,176 is a continuation-in-part of application No. 15/595,511, filed on May 15, 2017, now Pat. No. 10,029,555, which is a continuation of application No. 14/792,532, filed on Jul. 6, 2015, now Pat. No. 9,650,032, which is a continuation-in-part of application No. 14/624,285, filed on Feb. 17, 2015, now Pat. No. 9,651,120, said application No. 15/693,176 is a continuation-in-part of application No. 15/601,670, filed on May 22, 2017, now Pat. No. 9,908,520, which is a continuation of application No. 14/792,535, filed on Jul. 6, 2015, now Pat. No. 9,656,659, which is a continuation-in-part of application No. 14/624,285, filed on Feb. 17, 2015, now Pat. No. 9,651,120.

(60) Provisional application No. 62/630,586, filed on Feb. 14, 2018.

(51) Int. Cl.
*B60K 6/387* (2007.10)
*B60K 6/442* (2007.10)
*B60K 6/445* (2007.10)
*F16H 37/08* (2006.01)
*F16H 37/02* (2006.01)
*B60K 6/38* (2007.10)

(52) U.S. Cl.
CPC ............ *B60K 6/445* (2013.01); *F16H 3/728* (2013.01); *B60K 2006/381* (2013.01); *F16H 37/02* (2013.01); *F16H 37/084* (2013.01); *F16H 2037/0866* (2013.01); *F16H 2037/0873* (2013.01); *F16H 2200/20* (2013.01); *F16H 2200/2002* (2013.01); *F16H 2200/203* (2013.01); *F16H 2200/2007* (2013.01); *F16H 2200/2043* (2013.01); *Y02T 10/62* (2013.01); *Y10S 903/917* (2013.01)

(58) Field of Classification Search
CPC .... B60K 23/0808; B60K 25/00; B60K 6/365; B60K 6/387; B60K 6/442; B60K 6/445; B60K 6/52; B60K 1/02; F16H 2037/0866; F16H 2037/0873; F16H 2200/20; F16H 2200/2002; F16H 37/02; F16H 37/084; F16H 3/728; F16H 3/727; F16H 2200/2007; Y02T 10/6239; Y10S 903/917
See application file for complete search history.

(56) References Cited

U.S. PATENT DOCUMENTS

| | | |
|---|---|---|
| 3,690,559 A | 9/1972 | Rudloff |
| 3,764,867 A | 10/1973 | Smi |
| 3,799,284 A | 3/1974 | Hender |
| 3,865,209 A | 2/1975 | Aihara et al. |
| 3,966,067 A | 6/1976 | Reese |
| 4,021,704 A | 5/1977 | Norbeck |
| 4,088,934 A | 5/1978 | D'Atre et al. |
| 4,097,925 A | 6/1978 | Butler, Jr. |
| 4,113,045 A | 9/1978 | Downing, Jr. |
| 4,196,785 A | 4/1980 | Downing, Jr. |
| 4,292,531 A | 9/1981 | Williamson |
| 4,319,140 A | 3/1982 | Paschke |
| 4,336,418 A | 6/1982 | Hoag |
| 4,347,907 A | 9/1982 | Downing, Jr. |
| 4,411,171 A | 10/1983 | Fiala |
| 4,423,362 A | 12/1983 | Konrad et al. |
| 4,423,794 A | 1/1984 | Beck |
| 4,444,285 A | 4/1984 | Stewart et al. |
| 4,461,988 A | 7/1984 | Plunkett |
| 4,533,011 A | 8/1985 | Heidemeyer et al. |
| 4,562,894 A | 1/1986 | Yang |
| 4,719,361 A | 1/1988 | Brubaker |
| 4,760,275 A | 7/1988 | Sato et al. |
| 4,774,399 A | 9/1988 | Fujita et al. |
| 4,774,811 A | 10/1988 | Kawamura |
| 4,809,177 A | 2/1989 | Windle et al. |
| 4,953,646 A | 9/1990 | Kim |
| 4,966,242 A | 10/1990 | Baillargeon |
| 4,985,845 A | 1/1991 | Goetz et al. |
| 5,067,932 A | 11/1991 | Edwards |
| 5,081,832 A | 1/1992 | Mowill |
| 5,120,282 A | 6/1992 | Fjaellstroem |
| 5,168,946 A | 12/1992 | Dorgan |
| 5,180,456 A | 1/1993 | Schultz et al. |
| 5,195,600 A | 3/1993 | Dorgan |
| 5,201,629 A | 4/1993 | Simpson et al. |
| 5,227,703 A | 7/1993 | Boothe et al. |
| 5,263,524 A | 11/1993 | Boardman |
| 5,264,763 A | 11/1993 | Avitan |
| 5,289,093 A | 2/1994 | Jobard |
| 5,291,960 A | 3/1994 | Brandenburg et al. |
| 5,343,971 A | 9/1994 | Heidelberg et al. |
| 5,345,154 A | 9/1994 | King |
| 5,369,540 A | 11/1994 | Konrad et al. |
| 5,389,825 A | 2/1995 | Ishikawa et al. |
| 5,409,425 A | 4/1995 | Shibahata |
| 5,417,299 A | 5/1995 | Pillar et al. |
| 5,418,437 A | 5/1995 | Couture et al. |
| 5,448,561 A | 9/1995 | Kaiser et al. |
| 5,498,208 A | 3/1996 | Braun |
| 5,501,567 A | 3/1996 | Lanzdorf et al. |
| 5,504,655 A | 4/1996 | Underwood et al. |
| 5,508,594 A | 4/1996 | Underwood et al. |
| 5,508,689 A | 4/1996 | Rado et al. |
| 5,516,379 A | 5/1996 | Schultz |
| 5,538,274 A | 7/1996 | Schmitz et al. |
| 5,558,175 A | 9/1996 | Sherman |
| 5,558,588 A | 9/1996 | Schmidt |
| 5,558,589 A | 9/1996 | Schmidt |
| 5,558,595 A | 9/1996 | Schmidt et al. |
| 5,568,023 A | 10/1996 | Grayer et al. |
| 5,575,730 A | 11/1996 | Edwards et al. |
| 5,575,737 A | 11/1996 | Weiss |
| 5,586,613 A | 12/1996 | Ehsani |
| 5,589,743 A | 12/1996 | King |
| 5,607,028 A | 3/1997 | Braun et al. |
| 5,629,567 A | 5/1997 | Kumar |
| 5,629,603 A | 5/1997 | Kinoshita |
| 5,646,510 A | 7/1997 | Kumar |
| 5,669,470 A | 9/1997 | Ross |
| 5,669,842 A | 9/1997 | Schmidt |
| 5,672,920 A | 9/1997 | Donegan et al. |
| 5,679,085 A | 10/1997 | Fredriksen et al. |
| 5,713,425 A | 2/1998 | Buschhaus et al. |
| 5,722,502 A | 3/1998 | Kubo |
| 5,767,584 A | 6/1998 | Gore et al. |
| 5,786,640 A | 7/1998 | Sakai et al. |
| 5,789,882 A | 8/1998 | Ibaraki et al. |
| 5,813,487 A | 9/1998 | Lee et al. |
| 5,813,488 A | 9/1998 | Weiss |
| 5,820,150 A | 10/1998 | Archer et al. |
| 5,820,258 A | 10/1998 | Braun |
| 5,828,554 A | 10/1998 | Donegan et al. |
| 5,847,520 A | 12/1998 | Theurillat et al. |
| 5,865,263 A | 2/1999 | Yamaguchi et al. |

(56) References Cited

U.S. PATENT DOCUMENTS

| | | |
|---|---|---|
| 5,879,265 A | 3/1999 | Bek |
| 5,880,570 A | 3/1999 | Tamaki et al. |
| 5,881,559 A | 3/1999 | Kawamura |
| 5,895,333 A | 4/1999 | Morisawa et al. |
| 5,924,879 A | 7/1999 | Kameyama |
| 5,925,993 A | 7/1999 | Lansberry |
| 5,927,417 A | 7/1999 | Brunner et al. |
| 5,934,395 A | 8/1999 | Koide et al. |
| 5,939,794 A | 8/1999 | Sakai et al. |
| 5,947,855 A | 9/1999 | Weiss |
| 5,957,985 A | 9/1999 | Wong et al. |
| 5,973,463 A | 10/1999 | Okuda et al. |
| 5,980,410 A | 11/1999 | Stemler et al. |
| 5,986,416 A | 11/1999 | Dubois |
| 5,991,683 A | 11/1999 | Takaoka et al. |
| 5,998,880 A | 12/1999 | Kumar |
| 6,005,358 A | 12/1999 | Radev |
| 6,012,004 A | 1/2000 | Sugano et al. |
| 6,028,403 A | 2/2000 | Fukatsu |
| 6,038,500 A | 3/2000 | Weiss |
| 6,054,844 A | 4/2000 | Frank |
| 6,086,074 A | 7/2000 | Braun |
| 6,104,148 A | 8/2000 | Kumar et al. |
| 6,105,984 A | 8/2000 | Schmitz et al. |
| 6,110,066 A | 8/2000 | Nedungadi et al. |
| 6,201,310 B1 | 3/2001 | Adachi et al. |
| 6,298,932 B1 | 10/2001 | Bowman et al. |
| 6,356,817 B1 | 3/2002 | Abe |
| 6,371,878 B1 | 4/2002 | Bowen |
| 6,387,007 B1 | 5/2002 | Fini, Jr. |
| 6,404,607 B1 | 6/2002 | Burgess et al. |
| 6,421,593 B1 | 7/2002 | Kempen et al. |
| 6,434,470 B1 | 8/2002 | Nantz et al. |
| 6,478,705 B1 | 11/2002 | Holmes et al. |
| 6,496,393 B1 | 12/2002 | Patwardhan |
| 6,501,368 B1 | 12/2002 | Wiebe et al. |
| 6,516,914 B1 | 2/2003 | Andersen et al. |
| 6,520,494 B1 | 2/2003 | Andersen et al. |
| 6,553,287 B1 | 4/2003 | Supina et al. |
| 6,553,290 B1 | 4/2003 | Pillar |
| 6,561,718 B1 | 5/2003 | Archer et al. |
| 6,563,230 B2 | 5/2003 | Nada |
| 6,575,866 B2 | 6/2003 | Bowen |
| 6,580,953 B1 | 6/2003 | Wiebe et al. |
| 6,607,466 B2 | 8/2003 | Bordini |
| 6,611,116 B2 | 8/2003 | Bachman et al. |
| 6,702,709 B2 | 3/2004 | Bowen |
| 6,722,458 B2 | 4/2004 | Hofbauer |
| 6,726,592 B2 | 4/2004 | Kotani |
| 6,757,597 B2 | 6/2004 | Yakes et al. |
| 6,764,085 B1 | 7/2004 | Anderson |
| 6,793,600 B2 | 9/2004 | Hiraiwa |
| 6,819,985 B2 | 11/2004 | Minagawa et al. |
| 6,846,257 B2 | 1/2005 | Baker et al. |
| 6,852,053 B2 | 2/2005 | Nakano et al. |
| 6,852,054 B2 | 2/2005 | Tumback et al. |
| 6,860,332 B1 | 3/2005 | Archer et al. |
| 6,882,917 B2 | 4/2005 | Pillar et al. |
| 6,885,920 B2 | 4/2005 | Yakes et al. |
| 6,886,647 B1 | 5/2005 | Gotta |
| 6,909,944 B2 | 6/2005 | Pillar et al. |
| 6,922,615 B2 | 7/2005 | Pillar et al. |
| 6,953,409 B2 | 10/2005 | Schmidt et al. |
| 6,973,600 B2 | 12/2005 | Lau et al. |
| 6,976,688 B2 | 12/2005 | Archer et al. |
| 6,991,054 B2 | 1/2006 | Takaoka et al. |
| 6,993,421 B2 | 1/2006 | Pillar et al. |
| 6,994,646 B2 | 2/2006 | Ai |
| 7,000,717 B2 | 2/2006 | Ai et al. |
| 7,004,868 B2 | 2/2006 | Oshidari et al. |
| 7,006,902 B2 | 2/2006 | Archer et al. |
| 7,024,296 B2 | 4/2006 | Squires et al. |
| 7,053,566 B2 | 5/2006 | Aizawa et al. |
| 7,072,745 B2 | 7/2006 | Pillar et al. |
| 7,073,620 B2 | 7/2006 | Braun et al. |
| 7,073,847 B2 | 7/2006 | Morrow et al. |
| 7,076,356 B2 | 7/2006 | Hubbard et al. |
| 7,086,977 B2 | 8/2006 | Supina et al. |
| 7,107,129 B2 | 9/2006 | Rowe et al. |
| 7,127,331 B2 | 10/2006 | Pillar et al. |
| 7,140,461 B2 | 11/2006 | Morrow |
| 7,154,236 B1 | 12/2006 | Heap |
| 7,162,332 B2 | 1/2007 | Pillar et al. |
| 7,164,977 B2 | 1/2007 | Yakes et al. |
| 7,179,187 B2 | 2/2007 | Raghavan et al. |
| 7,184,862 B2 | 2/2007 | Pillar et al. |
| 7,184,866 B2 | 2/2007 | Squires et al. |
| 7,196,430 B2 | 3/2007 | Yang |
| 7,204,776 B2 | 4/2007 | Minagawa et al. |
| 7,217,211 B2 | 5/2007 | Klemen et al. |
| 7,219,756 B2 | 5/2007 | Bischoff |
| 7,223,200 B2 | 5/2007 | Kojima et al. |
| 7,234,534 B2 | 6/2007 | Froland et al. |
| 7,246,672 B2 | 7/2007 | Shirai et al. |
| 7,254,468 B2 | 8/2007 | Pillar et al. |
| 7,258,194 B2 | 8/2007 | Braun et al. |
| 7,274,976 B2 | 9/2007 | Rowe et al. |
| 7,276,007 B2 | 10/2007 | Takami et al. |
| 7,277,782 B2 | 10/2007 | Yakes et al. |
| 7,282,003 B2 | 10/2007 | Klemen et al. |
| 7,302,320 B2 | 11/2007 | Nasr et al. |
| 7,306,064 B2 | 12/2007 | Imazu et al. |
| 7,322,896 B2 | 1/2008 | Minagawa |
| 7,338,401 B2 | 3/2008 | Klemen et al. |
| 7,357,203 B2 | 4/2008 | Morrow et al. |
| 7,363,996 B2 | 4/2008 | Kamada et al. |
| 7,367,415 B2 | 5/2008 | Oliver et al. |
| 7,367,911 B2 | 5/2008 | Reghavan et al. |
| 7,379,797 B2 | 5/2008 | Nasr et al. |
| 7,392,122 B2 | 6/2008 | Pillar et al. |
| 7,412,307 B2 | 8/2008 | Pillar et al. |
| 7,419,021 B2 | 9/2008 | Morrow et al. |
| 7,439,711 B2 | 10/2008 | Bolton |
| 7,448,460 B2 | 11/2008 | Morrow et al. |
| 7,451,028 B2 | 11/2008 | Pillar et al. |
| 7,462,122 B2 | 12/2008 | Reghavan et al. |
| 7,467,678 B2 | 12/2008 | Tanaka et al. |
| 7,479,080 B2 | 1/2009 | Usoro |
| 7,493,980 B2 | 2/2009 | Hidaka |
| 7,520,354 B2 | 4/2009 | Morrow et al. |
| 7,521,814 B2 | 4/2009 | Nasr |
| 7,522,979 B2 | 4/2009 | Pillar |
| 7,527,573 B2 | 5/2009 | Lang et al. |
| 7,555,369 B2 | 6/2009 | Pillar et al. |
| 7,572,201 B2 | 8/2009 | Supina et al. |
| 7,576,501 B2 | 8/2009 | Okubo et al. |
| 7,597,164 B2 | 10/2009 | Severinsky et al. |
| 7,601,093 B2 | 10/2009 | Tabata et al. |
| 7,635,039 B2 | 12/2009 | Fujiwara et al. |
| 7,678,014 B2 | 3/2010 | Nohara et al. |
| 7,689,332 B2 | 3/2010 | Yakes et al. |
| 7,711,460 B2 | 5/2010 | Yakes et al. |
| 7,715,962 B2 | 5/2010 | Rowe et al. |
| 7,725,225 B2 | 5/2010 | Pillar et al. |
| 7,729,831 B2 | 6/2010 | Pillar et al. |
| 7,749,131 B2 | 7/2010 | Imamura et al. |
| 7,756,621 B2 | 7/2010 | Pillar et al. |
| 7,784,554 B2 | 8/2010 | Grady et al. |
| 7,792,618 B2 | 9/2010 | Quigley et al. |
| 7,811,191 B2 | 10/2010 | Iwase et al. |
| 7,824,293 B2 | 11/2010 | Schimke |
| 7,835,838 B2 | 11/2010 | Pillar et al. |
| 7,848,857 B2 | 12/2010 | Nasr et al. |
| 7,874,373 B2 | 1/2011 | Morrow et al. |
| 7,878,750 B2 | 2/2011 | Zhou et al. |
| 7,888,894 B2 | 2/2011 | Sugawara et al. |
| 7,908,063 B2 | 3/2011 | Sah |
| 7,927,250 B2 | 4/2011 | Imamura et al. |
| 7,931,103 B2 | 4/2011 | Morrow et al. |
| 7,935,021 B2 | 5/2011 | Tabata et al. |
| 7,935,022 B2 | 5/2011 | Iwase et al. |
| 7,937,194 B2 | 5/2011 | Nasr et al. |
| 7,941,259 B2 | 5/2011 | Tabata et al. |
| 7,972,237 B2 | 7/2011 | Ota |

(56) References Cited

U.S. PATENT DOCUMENTS

| | | |
|---|---|---|
| 8,000,850 B2 | 8/2011 | Nasr et al. |
| 8,007,402 B2 | 8/2011 | Tabata et al. |
| 8,038,572 B2 | 10/2011 | Matsubara et al. |
| 8,062,172 B2 | 11/2011 | Supina et al. |
| 8,068,947 B2 | 11/2011 | Conlon et al. |
| 8,091,662 B2 | 1/2012 | Tolksdorf |
| 8,095,247 B2 | 1/2012 | Pillar et al. |
| 8,123,645 B2 | 2/2012 | Schimke |
| 8,231,491 B2 | 7/2012 | Oba et al. |
| 8,337,352 B2 | 12/2012 | Morrow et al. |
| 8,444,517 B2 | 5/2013 | Gradu et al. |
| 8,459,619 B2 | 6/2013 | Trinh et al. |
| 8,491,438 B2 | 7/2013 | Kim et al. |
| 8,561,735 B2 | 10/2013 | Morrow et al. |
| 8,696,506 B2 | 4/2014 | Kaltenbach et al. |
| 8,788,162 B2 | 7/2014 | Park |
| 8,795,113 B2 | 8/2014 | Grochowski et al. |
| 8,801,318 B2 | 8/2014 | Knoble et al. |
| 8,801,567 B2 | 8/2014 | Demirovic et al. |
| 8,818,588 B2 | 8/2014 | Ambrosio et al. |
| 8,864,613 B2 | 10/2014 | Morrow et al. |
| 8,894,526 B2 | 11/2014 | Kozarekar et al. |
| 8,905,892 B1 | 12/2014 | Lee et al. |
| 9,033,836 B2 | 5/2015 | Hiraiwa |
| 9,114,699 B2 | 8/2015 | Takei et al. |
| 9,114,804 B1 | 8/2015 | Shukla et al. |
| 9,132,736 B1 | 9/2015 | Shukla et al. |
| 9,376,102 B1 | 6/2016 | Shukla et al. |
| 9,428,042 B2 | 8/2016 | Morrow et al. |
| 9,452,750 B2 | 9/2016 | Shukla et al. |
| 9,492,695 B2 | 11/2016 | Betz et al. |
| 9,504,863 B2 | 11/2016 | Moore |
| 9,579,530 B2 | 2/2017 | Betz et al. |
| 9,580,962 B2 | 2/2017 | Betz et al. |
| 9,650,032 B2 | 5/2017 | Kotloski et al. |
| 9,651,120 B2 | 5/2017 | Morrow et al. |
| 9,656,659 B2 | 5/2017 | Shukla et al. |
| 9,677,334 B2 | 6/2017 | Aiken et al. |
| 9,821,789 B2 | 11/2017 | Shukla et al. |
| 9,908,520 B2 | 3/2018 | Shukla et al. |
| 9,970,515 B2 | 5/2018 | Morrow et al. |
| 10,029,555 B2 | 7/2018 | Kotloski et al. |
| 2002/0005304 A1 | 1/2002 | Bachman et al. |
| 2002/0045507 A1 | 4/2002 | Bowen |
| 2002/0065594 A1 | 5/2002 | Squires et al. |
| 2003/0130765 A1 | 7/2003 | Pillar et al. |
| 2003/0158635 A1 | 8/2003 | Pillar et al. |
| 2003/0163228 A1 | 8/2003 | Pillar et al. |
| 2003/0163230 A1 | 8/2003 | Pillar et al. |
| 2003/0166429 A1 | 9/2003 | Tumback |
| 2003/0171854 A1 | 9/2003 | Pillar et al. |
| 2003/0195680 A1 | 10/2003 | Pillar |
| 2003/0200015 A1 | 10/2003 | Pillar |
| 2003/0230443 A1 | 12/2003 | Cramer et al. |
| 2004/0019414 A1 | 1/2004 | Pillar et al. |
| 2004/0024502 A1 | 2/2004 | Squires et al. |
| 2004/0039510 A1 | 2/2004 | Archer et al. |
| 2004/0040775 A1 | 3/2004 | Shimizu et al. |
| 2004/0055802 A1 | 3/2004 | Pillar et al. |
| 2004/0069865 A1 | 4/2004 | Rowe et al. |
| 2004/0133319 A1 | 7/2004 | Pillar et al. |
| 2004/0133332 A1 | 7/2004 | Yakes et al. |
| 2004/0198551 A1 | 10/2004 | Joe et al. |
| 2004/0199302 A1 | 10/2004 | Pillar et al. |
| 2004/0251862 A1 | 12/2004 | Imai |
| 2005/0004733 A1 | 1/2005 | Pillar et al. |
| 2005/0038934 A1 | 2/2005 | Gotze et al. |
| 2005/0113988 A1 | 5/2005 | Nasr et al. |
| 2005/0113996 A1 | 5/2005 | Pillar et al. |
| 2005/0114007 A1 | 5/2005 | Pillar et al. |
| 2005/0119806 A1 | 6/2005 | Nasr et al. |
| 2005/0131600 A1 | 6/2005 | Quigley et al. |
| 2005/0137042 A1 | 6/2005 | Schmidt et al. |
| 2005/0209747 A1 | 9/2005 | Yakes et al. |
| 2005/0234622 A1 | 10/2005 | Pillar et al. |
| 2005/0252703 A1 | 11/2005 | Schmidt et al. |
| 2006/0111213 A1 | 5/2006 | Bucknor et al. |
| 2006/0128513 A1 * | 6/2006 | Tata ............... B60W 10/105 475/5 |
| 2006/0223663 A1 | 10/2006 | Bucknor et al. |
| 2006/0276288 A1 | 12/2006 | Iwanaka et al. |
| 2006/0289212 A1 | 12/2006 | Haruhisa |
| 2007/0021256 A1 | 1/2007 | Klemen et al. |
| 2007/0105678 A1 | 5/2007 | Bucknor et al. |
| 2007/0243966 A1 | 10/2007 | Holmes et al. |
| 2007/0254761 A1 | 11/2007 | Kim |
| 2007/0256870 A1 | 11/2007 | Holmes et al. |
| 2007/0275808 A1 | 11/2007 | Iwanaka et al. |
| 2008/0150350 A1 | 6/2008 | Morrow et al. |
| 2008/0200296 A1 | 8/2008 | Holmes |
| 2008/0234087 A1 | 9/2008 | Besnard et al. |
| 2008/0269000 A1 | 10/2008 | Abe et al. |
| 2008/0280726 A1 | 11/2008 | Holmes et al. |
| 2009/0054202 A1 | 2/2009 | Yamakado et al. |
| 2009/0194347 A1 | 8/2009 | Morrow et al. |
| 2009/0209381 A1 | 8/2009 | Ai et al. |
| 2009/0221390 A1 | 9/2009 | Houle |
| 2009/0227409 A1 | 9/2009 | Ito et al. |
| 2009/0227417 A1 | 9/2009 | Imamura et al. |
| 2009/0275437 A1 | 11/2009 | Kersting |
| 2010/0029428 A1 | 2/2010 | Abe et al. |
| 2010/0051361 A1 | 3/2010 | Katsuta et al. |
| 2010/0051367 A1 | 3/2010 | Yamada et al. |
| 2010/0070008 A1 | 3/2010 | Parker et al. |
| 2010/0120579 A1 | 5/2010 | Kawasaki |
| 2010/0121512 A1 | 5/2010 | Takahashi et al. |
| 2010/0138086 A1 | 6/2010 | Imamura et al. |
| 2010/0145589 A1 | 6/2010 | Kobayashi |
| 2010/0179009 A1 | 7/2010 | Wittkopp et al. |
| 2010/0227722 A1 | 9/2010 | Conlon |
| 2010/0261565 A1 | 10/2010 | Ai et al. |
| 2010/0301668 A1 | 12/2010 | Yakes et al. |
| 2010/0312423 A1 | 12/2010 | Steinhauser et al. |
| 2010/0326752 A1 | 12/2010 | Lamperth |
| 2011/0127095 A1 | 6/2011 | Imamura et al. |
| 2011/0130234 A1 | 6/2011 | Phillips |
| 2011/0143875 A1 | 6/2011 | Ono et al. |
| 2011/0312459 A1 | 12/2011 | Morrow et al. |
| 2011/0319211 A1 | 12/2011 | Si |
| 2012/0022737 A1 | 1/2012 | Kumazaki et al. |
| 2012/0226401 A1 | 9/2012 | Naito |
| 2013/0090202 A1 | 4/2013 | Hiraiwa |
| 2013/0151131 A1 | 6/2013 | Laszio et al. |
| 2013/0196806 A1 | 8/2013 | Morrow et al. |
| 2013/0260936 A1 | 10/2013 | Takei et al. |
| 2013/0296108 A1 | 11/2013 | Ortmann et al. |
| 2014/0094334 A1 | 4/2014 | Tamai et al. |
| 2014/0136035 A1 | 5/2014 | Boskovitch et al. |
| 2014/0141915 A1 | 5/2014 | Naqi et al. |
| 2014/0228168 A1 | 8/2014 | Kaufman et al. |
| 2014/0229043 A1 | 8/2014 | Frank et al. |
| 2014/0235394 A1 | 8/2014 | Smetana et al. |
| 2014/0243149 A1 | 8/2014 | Holmes et al. |
| 2014/0269145 A1 | 9/2014 | Fasana et al. |
| 2014/0288756 A1 | 9/2014 | Tanaka et al. |
| 2014/0303822 A1 | 10/2014 | Kawamura et al. |
| 2014/0335995 A1 | 11/2014 | Swales et al. |
| 2014/0350803 A1 | 11/2014 | Ye et al. |
| 2014/0357441 A1 | 12/2014 | Supina |
| 2014/0358340 A1 | 12/2014 | Radev |
| 2015/0024894 A1 | 1/2015 | Lee et al. |
| 2015/0246331 A1 | 9/2015 | Broker et al. |
| 2015/0283894 A1 | 10/2015 | Morrow et al. |
| 2015/0292600 A1 | 10/2015 | Ai et al. |
| 2015/0377327 A1 | 12/2015 | Lee et al. |
| 2016/0133557 A1 | 5/2016 | Mortensen et al. |
| 2016/0288780 A1 | 10/2016 | Shukla et al. |
| 2016/0311253 A1 | 10/2016 | Palmer et al. |
| 2016/0361987 A1 | 12/2016 | Morrow et al. |
| 2017/0008507 A1 | 1/2017 | Shukla et al. |
| 2017/0108085 A1 | 4/2017 | Morrow et al. |
| 2017/0246946 A1 | 8/2017 | Morrow et al. |
| 2017/0246947 A1 | 8/2017 | Kotloski et al. |
| 2017/0253229 A1 | 9/2017 | Shukla et al. |

(56) References Cited

U.S. PATENT DOCUMENTS

| | | |
|---|---|---|
| 2017/0363180 A1 | 12/2017 | Steinberger et al. |
| 2017/0370446 A1 | 12/2017 | Steinberger et al. |
| 2018/0023671 A1 | 1/2018 | Watt et al. |
| 2018/0023672 A1 | 1/2018 | Watt et al. |
| 2018/0031085 A1 | 2/2018 | Steinberger et al. |
| 2018/0072303 A1 | 3/2018 | Shukla et al. |

FOREIGN PATENT DOCUMENTS

| | | |
|---|---|---|
| CN | 101323243 A | 12/2008 |
| CN | 101356070 A | 1/2009 |
| CN | 101631688 A | 1/2010 |
| CN | 103158526 A | 6/2013 |
| CN | 104553731 A | 4/2015 |
| CN | 107405990 | 11/2017 |
| DE | 18 16 183 | 6/1970 |
| DE | 41 08 647 A1 | 9/1992 |
| DE | 41 34 160 A1 | 4/1993 |
| DE | 44 31 929 C1 | 10/1995 |
| DE | 19749074 A1 | 5/1999 |
| DE | 19851436 A1 | 5/2000 |
| DE | 10 2011 109 352 | 2/2013 |
| DE | 2011109352 A1 | 2/2013 |
| DE | 10 2013 006 028 A1 | 10/2014 |
| EP | 0 791 506 A2 | 8/1997 |
| EP | 0 622 264 B1 | 11/1998 |
| EP | 0 898 213 A1 | 2/1999 |
| EP | 0 925 981 A2 | 6/1999 |
| EP | 1 018 451 A1 | 7/2000 |
| EP | 0 805 059 B1 | 8/2000 |
| EP | 1 092 406 A2 | 4/2001 |
| EP | 0 564 943 B1 | 6/2001 |
| EP | 1 142 744 A1 | 10/2001 |
| EP | 0 812 720 B1 | 12/2001 |
| EP | 1 229 636 A2 | 8/2002 |
| EP | 1 340 643 A2 | 9/2003 |
| EP | 0 937 600 B1 | 12/2005 |
| FR | 2658259 A1 | 8/1991 |
| GB | 1 308 318 | 2/1973 |
| GB | 2 302 850 A | 2/1997 |
| GB | 2 346 124 A | 8/2000 |
| GB | 2 400 588 | 1/2005 |
| GB | 2 400 589 | 2/2005 |
| GB | 2 400 590 | 3/2005 |
| JP | 60-216703 A | 10/1985 |
| JP | 2010-070008 A | 4/2010 |
| JP | 2013-112318 | 6/2013 |
| KR | 10-2010-0095073 A | 8/2010 |
| WO | WO-98/19875 A1 | 5/1998 |
| WO | WO-00/30235 A1 | 5/2000 |
| WO | WO-01/54939 A2 | 8/2001 |
| WO | WO-03/055714 A1 | 7/2003 |
| WO | WO-03/093046 A2 | 11/2003 |
| WO | WO-2004/083081 | 9/2004 |
| WO | WO-2004/110849 | 12/2004 |
| WO | WO-2006/028452 | 3/2006 |
| WO | WO-2006/037041 | 4/2006 |
| WO | WO-2006/037098 | 4/2006 |
| WO | WO-2006/037099 | 4/2006 |
| WO | WO-2007/108805 | 9/2007 |
| WO | WO-2011/041549 | 4/2011 |
| WO | WO-2011/163135 | 12/2011 |
| WO | WO-2014/090483 A1 | 6/2014 |
| WO | WO-2014/090486 A1 | 6/2014 |
| WO | WO-2014/102030 A1 | 7/2014 |
| WO | WO-2014/140096 A1 | 9/2014 |
| WO | WO-2014/058078 A1 | 10/2014 |
| WO | WO-2014/166723 A1 | 10/2014 |
| WO | WO-2016/133557 | 8/2016 |
| WO | WO-2016/172250 | 10/2016 |
| WO | WO-2017/007599 | 1/2017 |
| WO | WO-2017/007600 | 1/2017 |
| WO | WO-2017/070388 | 4/2017 |
| WO | WO-2017/106410 | 6/2017 |

OTHER PUBLICATIONS

International Search Report and Written Opinion on PCT/US2016/057971, dated Jan. 27, 2017, 11 pages.
International Search Report and Written Opinion on PCT/US2019/017854, dated May 10, 2019, 17 pages.
Bose, et al., "High Frequency AC vs. DC Distribution System for Next Generation Hybrid Electric Vehicle," Industrial Electronics, Control and Instrumentation, Proceedings of the 1996 IEEE IECON 22nd International Conference on Taipei, Taiwan, New York, New York, pp. 706-712 Aug. 5-10, 1996.
The European Search Report based on European Application No. EP 0724300, date of completion of the search Jul. 4, 2005, 2 pages.
Dana Spicer Central Tire Inflation System Specifications, Dana Corporation, Kalamazoo, Michigan, 2 pages, May 2000.
Diesel Locomotive Technology, http://www.railway-technical.com/diesel.shtml, available by Jan. 24, 2012, 15 pages.
International Search Report and Written Opinion for PCT Application No. PCT/US2015/050518, dated Feb. 9, 2016, 18 pages.
International Search Report and Written Opinion for PCT Application No. PCT/US2016/038587, dated Nov. 10, 2016, 15 pages.
International Search Report and Written Opinion for PCT Application PCT/US2016/038586, dated Oct. 21, 2016, 14 pages.
International Search Report and Written Opinion Received for PCT Application No. PCT/US2018/049158, Oshkosh Corporation, dated Dec. 13, 2018, 18 pages.
International Search Report and Written Opinion Received for PCT Application No. PCT/US2018/049550, dated Dec. 13, 2018, 18 pages.
International Search Report and Written Opinion Received for PCT Application No. PCT/US2018/053983, Oshkosh Corporation, dated Jan. 3, 2019, 18 pages.
International Search Report for PCT Application No. PCT/US2011/041089, dated Dec. 19, 2011, 6 pages.
Invitation to Pay Additional Fees regarding international Application No. PCT/US2011/041089, dated Sep. 6, 2011, 5 pages.
Khan, I.A., Automotive Electrical Systems: Architecture and Components, Digital Avionics Systems Conference, IEEE, pp. 8.C.5-1-8.C.5-10, 1999.
Miller, Hybrid Electric Vehicle Propulsion System Architectures of the e-CVT Type, IEEE Transactions on Power Electronics, vol. 21, No. 3, May 2006, 12 pages.
Namuduri, et al., High Power Density Electric Drive for an Hybrid Vehicle, Applied Power Electronics Conference and Exposition, pp. 34-40, Feb. 15, 1998.
Rajashekara, K., History of Electric Vehicles in General Motors, Industry Applications Society Annual Meeting, pp. 447-454, Oct. 2-8, 1993.
Search Report Received for Chinese Application No. 201580076245.5, Oshkosh Corporation, Jan. 2, 2019, 2 pages.
Shigley et al., Theory of Machines and Mechanisms, complete text, McGraw-Hill Book Company, published in the United States, 297 pages, 1980.
International Preliminary Report on Patentability regarding International Application No. PCT/US2018/049158, dated Mar. 12, 2020, 12 pps.

\* cited by examiner

MULTI-MODE ELECTROMECHANICAL VARIABLE TRANSMISSION

CROSS-REFERENCE TO RELATED PATENT APPLICATIONS

This application claims the benefit of U.S. Provisional Patent Application No. 62/630,586, filed Feb. 14, 2018, and is a continuation-in-part of U.S. application Ser. No. 15/725,154, filed Oct. 4, 2017, which is a continuation-in-part of U.S. application Ser. No. 15/698,415, filed Sep. 7, 2017, which is a continuation-in-part of U.S. application Ser. No. 15/693,176, filed Aug. 31, 2017, which is a continuation-in-part of: U.S. application Ser. No. 14/918,221, filed Oct. 20, 2015; U.S. application Ser. No. 15/595,443, filed May 15, 2017, now U.S. Pat. No. 9,970,515, which is a continuation of U.S. application Ser. No. 14/624,285, filed Feb. 17, 2015, now U.S. Pat. No. 9,651,120; U.S. application Ser. No. 15/595,511, filed May 15, 2017, now U.S. Pat. No. 10,029,555, which is a continuation of U.S. application Ser. No. 14/792,532, filed Jul. 6, 2015, now U.S. Pat. No. 9,650,032, which is a continuation-in-part of U.S. application Ser. No. 14/624,285, filed Feb. 17, 2015, now U.S. Pat. No. 9,651,120; and U.S. application Ser. No. 15/601,670, filed May 22, 2017, now U.S. Pat. No. 9,908,520, which is a continuation of U.S. application Ser. No. 14/792,535, filed Jul. 6, 2015, now U.S. Pat. No. 9,656,659, which is a continuation-in-part of U.S. application Ser. No. 14/624,285, filed Feb. 17, 2015, now U.S. Pat. No. 9,651,120, all of which are incorporated herein by reference in their entireties.

BACKGROUND

Traditional vehicle transmissions use gears and gear trains to provide speed and torque conversions from a rotating power source (e.g., an engine, a motor, etc.) to another device (e.g., a drive shaft, wheels of a vehicle, etc.). Transmissions include multiple gear ratios selectively coupled to the rotating power source with a mechanism that may also selectively couple an output to the various gear ratios.

SUMMARY

One exemplary embodiment relates to a drive system for a vehicle including a first electrical machine, a second electrical machine, a transmission, and an electrical energy supply. The transmission includes a first gear set, a second gear set, a connecting shaft coupled to the first gear set, a driveshaft configured to transport power from the first electrical machine and the second electrical machine to a tractive element of the vehicle, and a clutch. The first gear set includes a first sun gear, a first ring gear, a first series of planetary gears coupling the first sun gear to the first ring gear, and a first carrier rotationally supporting the first series of planetary gears, where the first gear set is coupled to the first electrical machine. The second gear set includes a second sun gear, a second ring gear, a second series of planetary gears coupling the second sun gear to the second ring gear, and a second carrier rotationally supporting the second series of planetary gears, where the second gear set is coupled to the second electrical machine. The first carrier is directly coupled to the second carrier. The clutch selectively rotationally couples the first carrier and the second carrier to the driveshaft when engaged. The electrical energy supply is configured to provide electrical energy to the first electrical machine and the second electrical machine. The drive system is at least selectively operable in an electric only configuration whereby the electrical energy supply provides electrical energy to at least one of the first electrical machine and the second electrical machine to drive at least one of the connecting shaft and the driveshaft without a mechanical energy input to the transmission from an engine.

Another exemplary embodiment relates to a drive system for a vehicle. The drive system includes a transmission, a first electromagnetic device, and a second electromagnetic device. The transmission includes a first planetary device coupled to the first electromagnetic device and a second planetary device directly coupled to the first planetary device and coupled to the second electromagnetic device. The transmission further includes a power takeoff output coupled to the first planetary device through a connecting shaft and an output at least selectively coupled to the first planetary device and the second planetary device. The first planetary device, the second planetary device, and the connecting shaft are radially aligned. The power takeoff output is configured to transfer rotational mechanical energy between the connecting shaft and an accessory. The output is radially offset from the first planetary device, the second planetary device, and the connecting shaft. The second electromagnetic device is at least selectively rotationally engaged with the connecting shaft.

Yet another exemplary embodiment relates to a method of operating a drive system for a vehicle in an electric only configuration. The method includes providing, by an electrical energy supply disposed onboard the vehicle, electrical energy to both (a) a first electrical machine coupled to a first planetary device of a transmission and (b) a second electrical machine coupled to a second planetary device of the transmission without providing a rotational mechanical energy input to the transmission from an engine. The first planetary device is directly coupled to the second planetary device. The method further includes driving, by at least one of the first electrical machine and the second electrical machine, a power takeoff output coupled to an accessory. The power takeoff output is coupled to the first planetary device with a connecting shaft that extends through the second planetary device and the second electrical machine.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a multi-mode electromechanical variable transmission is provided as part of a vehicle and is selectively reconfigurable into one of multiple operating modes. The vehicle may also include a first electromagnetic device, second electromagnetic device, and an energy storage device. The first electromagnetic device and the second electromagnetic device are configured to use electrical energy provided by the energy storage device and provide rotational mechanical energy to the transmission to propel the vehicle and/or power one or more accessories of the vehicle. The transmission includes a pair of planetary devices, a brake, and multiple clutches. The brake and the clutches are configured to be selectively engaged by a controller to reconfigure the transmission between the various operating modes.

Figure 1:
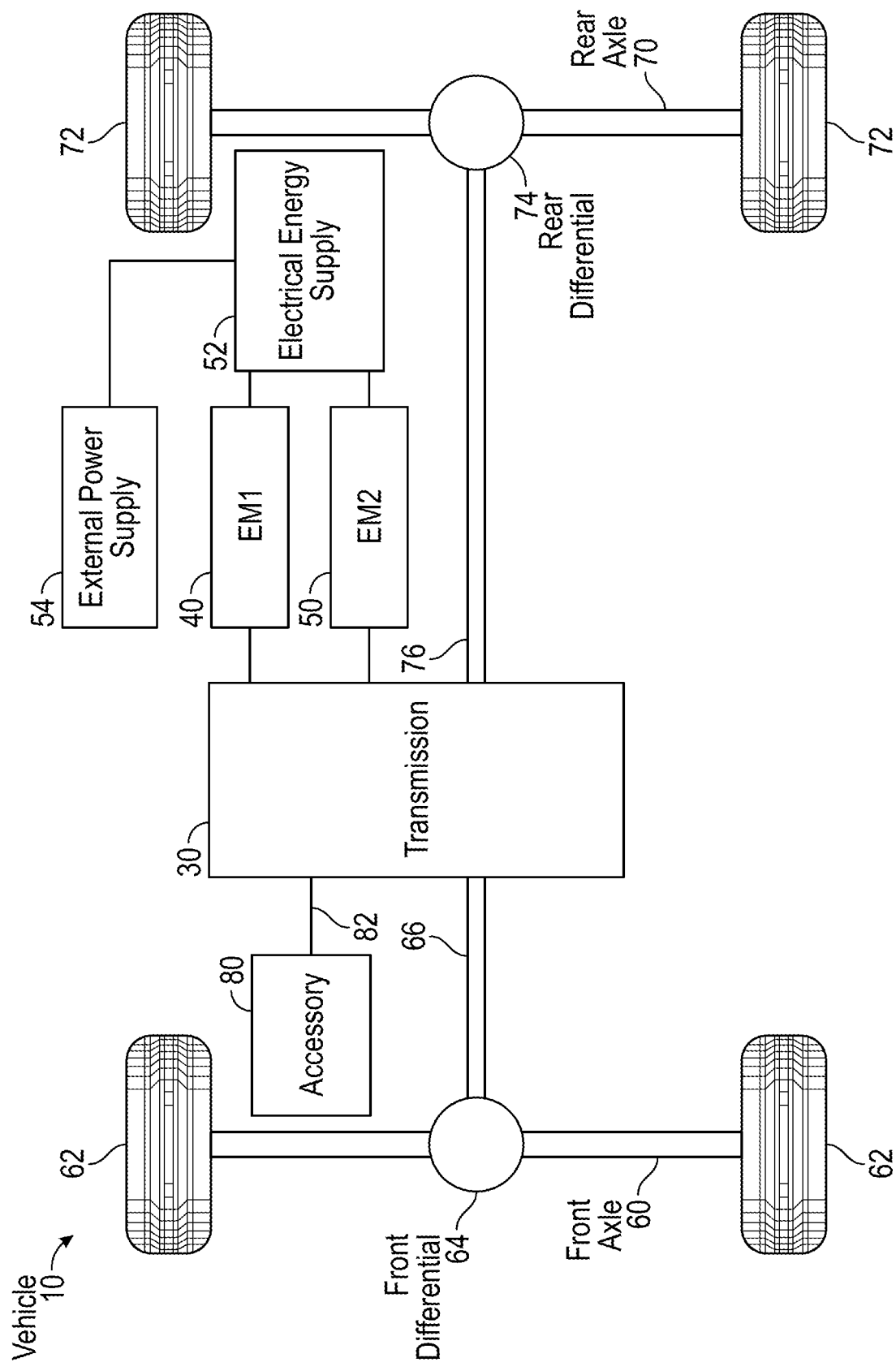
FIG. 1 is a schematic view of a drive train for a vehicle, according to an exemplary embodiment.
Figure 2:
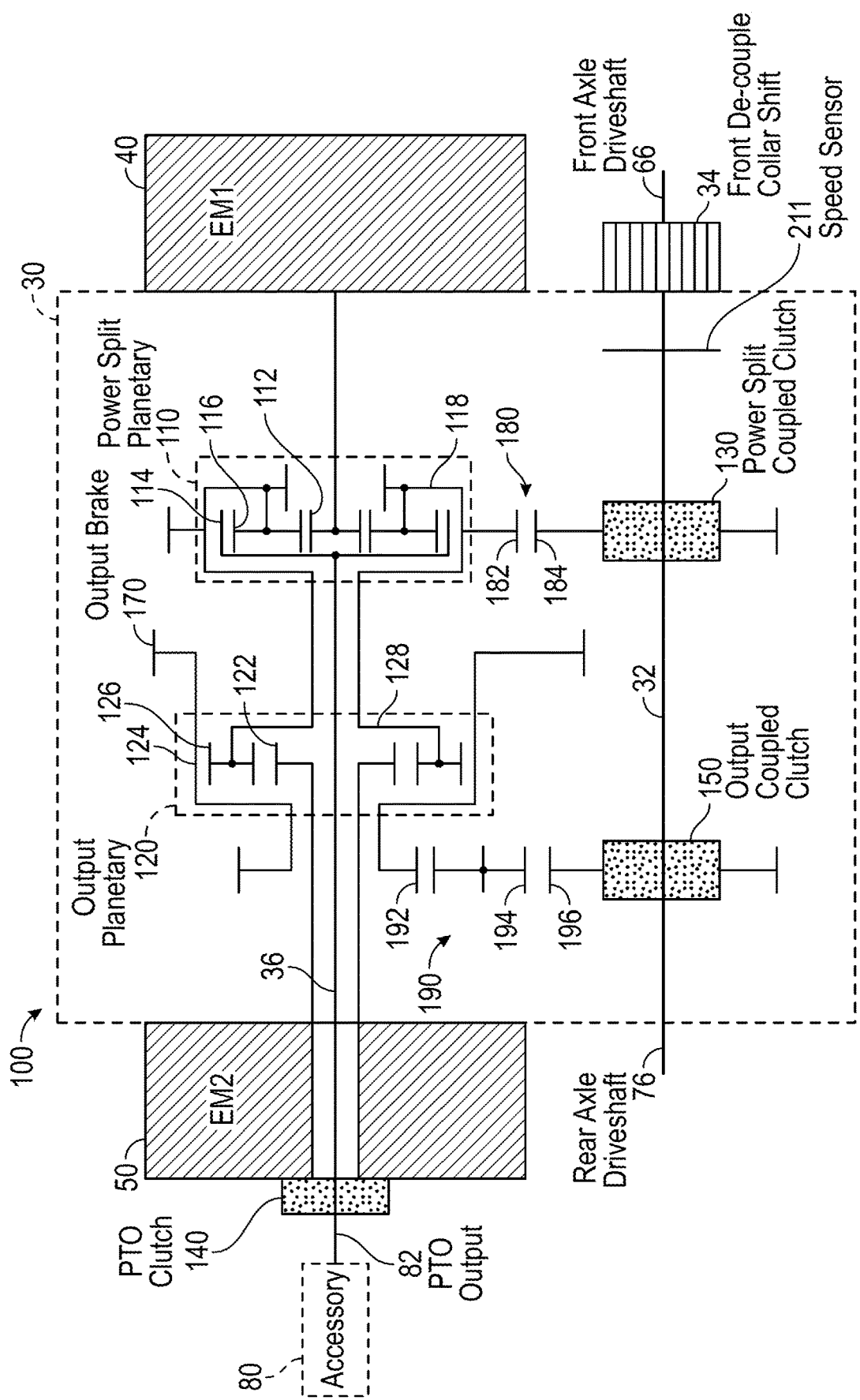
FIG. 2 is a detailed schematic view of the drive train of FIG. 1, according to an exemplary embodiment.

According to the exemplary embodiment shown in FIGS. 1 and 2, a vehicle 10 includes a transmission, shown as transmission 30. As shown in FIGS. 1 and 2, a first electrical machine, electromagnetic device, and/or motor/generator, shown as first electromagnetic device 40, and a second electrical machine, electromagnetic device, and/or motor/generator, shown as second electromagnetic device 50, are coupled to transmission 30. First electromagnetic device 40 and second electromagnetic device 50 are each configured to receive electrical energy from an energy generation device and/or energy storage device, shown as electrical energy supply 52, and provide a mechanical energy input to transmission 30. By way of example, first electromagnetic device 40 and second electromagnetic device 50 are configured to provide a rotational mechanical energy input to transmission 30. In some embodiments, vehicle 10 is a purely electric vehicle that does not include an engine. Accordingly, vehicle 10 may be constantly configured in an electric only configuration (e.g., where no mechanical energy is provided to transmission 30 by an engine).

Referring again to the exemplary embodiment shown in FIG. 1, vehicle 10 includes a front axle, shown as front axle 60, and a rear axle, shown as rear axle 70. As shown in FIG. 1, front axle 60 includes a pair of tractive elements, shown as tires 62, coupled to a front differential, shown as front differential 64. Rear axle 70 includes a pair of tractive elements, shown as tires 72, coupled to a rear differential, shown as rear differential 74, according to an exemplary embodiment. According to the exemplary embodiment shown in FIG. 1, front differential 64 is coupled to transmission 30 with a front axle driveshaft 66 and rear differential 74 is coupled to transmission 30 with a rear axle driveshaft 76. While shown as coupled to tires 62 and tires 72, front differential 64 and rear differential 74 may be coupled to various other types of tractive elements (e.g., tracks, etc.), according to alternative embodiments. As shown in FIG. 1, front axle driveshaft 66 and rear axle driveshaft 76 are configured to transport power from first electromagnetic device 40 and second electromagnetic device 50 to tires 62 and tires 72, respectively. Vehicle 10 may include multiple front differentials 64 that may be coupled or multiple rear differentials 74 that may be coupled (e.g., in a 6×6 configuration), according to various alternative embodiments.

As shown in FIG. 1, vehicle 10 may optionally include an accessory 80 driven by a power takeoff ("PTO") output 82 of transmission 30. In some embodiments, PTO output 82 includes a shaft. Accessory 80 may include any type of device or implement that is driven by a rotational mechanical energy input. Accordingly, PTO output 82 may include a shaft that is driven by transmission 30 and that engages and is received by accessory 80, transferring rotational mechanical energy. Alternatively, PTO output 82 may include a receptacle that engages and receives a shaft of accessory 80, transferring rotational mechanical energy. Accessory 80 may constantly be driven by PTO output 82. Alternatively, accessory 80 may include a clutch that selectively couples PTO output 82 to an output of accessory 80 to facilitate selective use of accessory 80 by an operator.

In some embodiments, accessory 80 includes an alternator or generator configured to receive rotational mechanical energy from PTO output 82 and provide electrical energy. In some such embodiments, the alternator provides electrical energy that is differently conditioned (e.g., alternating current instead of direct current or vice versa, at a different voltage, at a different current, etc.) than the electrical energy provided by electrical energy supply 52. By way of example, the alternator may provide electrical energy at a lower voltage to facilitate powering sensitive electronic equipment. In some embodiments, accessory 80 includes a compressor. By way of example, the compressor may be a compressor of an air conditioning system disposed onboard vehicle 10. By way of another example, the compressor may be an air compressor used to provide compressed air to power one or more pneumatic actuators (e.g., motors, cylinders, etc.). In some embodiments, accessory 80 includes a pump. By way of example, the pump may be a water pump configured to provide a flow of fluid (e.g., water) through a nozzle (e.g., for fire suppressant applications, for irrigation applications, for pressure washing applications, for concrete mixing applications, etc.). By way of another example, the pump may be a hydraulic pump used to provide pressurized hydraulic oil to power one or more hydraulic actuators (e.g., motors, cylinders, etc.). In some embodiments, the accessory 80 includes multiple such devices or implements.

Accessory 80 may include one or more implements that consume energy to perform a task. Such implements may utilize rotational mechanical energy from PTO output 82 directly, or may use another component, such as a generator, pump, or compressor, to convert the rotational mechanical energy to another form (e.g., electricity, pressurized gas, pressurized liquid, etc.) prior to use. The implements may be permanently coupled to the vehicle or may be removable and/or interchangeable (e.g., an attachment suite of a utility tractor). A first portion of accessory 80 may be permanently coupled to vehicle, while a second portion of accessory 80 is removable and/or interchangeable. By way of example, a pump of accessory 80 may be permanently coupled to vehicle 10, while various implements (e.g., lawnmowers, sweepers, and soil tillers, etc.) may be removable and interchangeable depending on the current application of vehicle 10.

Vehicle 10 may be configured for a broad variety of applications, including but not limited to transportation (e.g., consumer, commercial, etc.), military (e.g., troop transports, supply transports, tanks, etc.), emergency response (e.g., fire apparatuses, ambulances, police vehicles, etc.), agriculture (e.g., tractors, round bailers, harvesters, etc.), construction (e.g., cement mixers, cranes, excavators, dozers, dump trucks, steam rollers, etc.), mining (e.g., excavators, drilling machines, mining machines, etc.), access equipment (e.g., boom lifts, telehandlers, vertical lifts, scissor lifts, etc.), communications (e.g., broadcast vehicles, etc.), municipal (e.g., refuse vehicles, snow plows, etc.), towing vehicles, maintenance vehicles, utility tractors, all-terrain vehicles, and utility tractors. Accordingly, accessory 80 may include a broad variety of implements. The implements may include, but are not limited to, lights (e.g., spotlights, headlights, cabin lights, etc.), sirens, boom lifts, vertical lifts, scissor lifts, telehandlers, weapon systems (e.g., turrets, reloading systems, etc.), winches, water pumps, turntables, ladders (e.g., extendable, single section, etc.), downriggers, outriggers, refuse compactors, lifting arms, cranes, welding machines, computer systems, broadcast systems, mixing drums, material handling buckets, plows, post hole diggers, fertilizer spreaders, lawnmowers, tree stump grinders, post drivers, rotary soil tillers, snow blowers, planters, chemical sprayers (e.g., for pesticide, herbicide, or fire suppressant foam), chipper/mulchers, rotating brooms, flail cutters, horizontal boring units, jackhammers, saws (e.g., a chain saw, a brush saw, etc.), grapples, and trenchers.

In one embodiment, at least one of first electromagnetic device 40 and second electromagnetic device 50 provide a mechanical energy input to transmission 30. By way of example, at least one of first electromagnetic device 40 and second electromagnetic device 50 may be configured to provide a rotational mechanical energy input to transmission 30 (i.e., at least one of first electromagnetic device 40 and second electromagnetic device 50 may operate as a motor, etc.). At least one of first electromagnetic device 40 and second electromagnetic device 50 may receive a mechanical energy output from transmission 30 (e.g., when vehicle 10 is traveling downhill and/or braking). By way of example, at least one of first electromagnetic device 40 and second electromagnetic device 50 may be configured to receive rotational mechanical energy from transmission 30 and provide an electrical energy output (i.e., at least one of first electromagnetic device 40 and second electromagnetic device 50 may operate as a generator, etc.). According to an exemplary embodiment, first electromagnetic device 40 and second electromagnetic device 50 are capable of both providing mechanical energy and converting a mechanical energy input into an electrical energy output (i.e., operate as a motor and a generator, etc.). The operational condition of first electromagnetic device 40 and second electromagnetic device 50 (e.g., as a motor, as a generator, etc.) may vary based on a mode of operation associated with transmission 30 and/or based on an operating condition of vehicle 10 (e.g., a loaded weight of vehicle 10, grade that vehicle 10 is climbing, a load on accessory 80, etc.).

Electrical energy supply 52 is disposed onboard vehicle 10 (e.g., coupled to a chassis of vehicle 10), according to an exemplary embodiment. Electrical energy supply 52 is configured to supply electrical energy to first electromagnetic device 40 and second electromagnetic device 50 to drive transmission 30. Electrical energy supply 52 may additionally supply electrical energy to power one or more other devices onboard vehicle 10 (e.g., lights, electric motors, pumps, compressors, controllers such as controller 210, sensors, etc.). Vehicle 10 may include inverters, converters, voltage regulators, current limiting devices, or other devices configured to condition the electrical power supplied by electrical energy supply 52 to the various devices of vehicle 10.

Electrical energy supply 52 may be configured to store and/or generate electrical energy to supply to transmission 30. In some embodiments, electrical energy supply 52 includes one or more battery modules containing one or more individual batteries (e.g., lithium ion batteries, lead acid batteries, nickel-cadmium batteries, etc.) that store energy chemically. Electrical energy supply 52 may include one or more capacitors or supercapacitors. Electrical energy supply 52 may store energy mechanically. By way of example, electrical energy supply 52 may include a flywheel driven by a motor that stores energy in rotational momentum of the flywheel. The motor may consume electrical energy to drive the flywheel to store energy or slow the flywheel to produce electrical energy. Electrical energy supply 52 may include an energy generation device (e.g., a generator, etc.) driven by a primary driver (e.g., an engine, a motor, etc.). In such an embodiment, the primary driver may receive stored energy in the form of fuel (e.g., gasoline, diesel, etc.) from a fuel tank and combust the fuel to supply mechanical energy to the generation device, thereby producing electrical energy to power first electromagnetic device 40 and second electromagnetic device 50. Alternatively, the primary driver may be another type of device (e.g., a fuel cell) that is otherwise powered (e.g., with gasoline, compressed natural gas, hydrogen, electricity, etc.). In yet other embodiments, electrical energy supply 52 includes another type of energy generation device, such as a solar panel.

Electrical energy supply 52 may be resupplied with stored energy when depleted. By way of example electrical energy supply 52 may be selectively connected to an external power source or external power supply 54 to recharge electrical energy supply 52 (e.g., if the electrical energy supply 52 includes a battery or capacitor). External power supply 54 may supply electrical energy to be stored in electrical energy supply 52. By way of example, external power supply 54 may be a power grid, a battery bank, a solar panel, a wind turbine, an energy generation device driven by a primary driver, or another source of electrical energy. External power supply 54 may be selectively coupled to electrical energy supply 52 (e.g., with an electrical cord) to supply electrical energy to electrical energy supply 52 when vehicle 10 is not in operation. Alternatively, in embodiments where electrical energy supply 52 includes a primary driver and an energy generation device, electrical energy supply 52 may be resupplied with additional fuel when the fuel in electrical energy supply 52 is depleted.

Alternatively, electrical energy supply 52 may be recharged by one or more sources of electrical energy onboard vehicle 10. By way of example, first electromagnetic device 40 and/or second electromagnetic device 50 may be driven to produce electrical energy that is subsequently stored in electrical energy supply 52. First electromagnetic device 40 and/or second electromagnetic device 50 may generate electrical energy when applying a braking force on front axle driveshaft 66 and/or rear axle driveshaft 76 (e.g., when vehicle 10 travels down a hill, when stopping vehicle 10, etc.). Alternatively, first electromagnetic device 40 and/or second electromagnetic device 50 may be driven by accessory 80 to generate electrical energy that is subsequently stored in electrical energy supply 52. By way of example, accessory 80 may include a turntable that rotates a mass, such as an aerial ladder assembly of a fire apparatus. While the turntable is in motion, it may be desired to slow or stop the movement of the turntable. First electromagnetic device 40 and/or second electromagnetic device 50 may apply a braking force on the turntable through transmission 30, thereby converting the rotational momentum of the turntable and the aerial ladder assembly into electrical energy. In some embodiments, electrical energy produced onboard vehicle 10 (e.g., by driving first electromagnetic device 40 and/or second electromagnetic device 50) is used directly (e.g., by first electromagnetic device 40 and/or second electromagnetic device 50, by lights or other subsystems of vehicle 10) without the electrical energy being stored.

According to the exemplary embodiment shown in FIG. 2, a drive system for a vehicle, shown as drive system 100, includes transmission 30, first electromagnetic device 40, second electromagnetic device 50, front axle driveshaft 66, and rear axle driveshaft 76. As shown in FIG. 2, transmission 30 includes a first gear set or power transmission device, shown as power split planetary 110, and a second gear set or power transmission device, shown as output planetary 120. In one embodiment, power split planetary 110 and output planetary 120 are disposed between first electromagnetic device 40 and second electromagnetic device 50. In an alternative embodiment, one or both of power split planetary 110 and output planetary 120 are positioned outside of (i.e., not between, etc.) first electromagnetic device 40 and second electromagnetic device 50.

Referring to the exemplary embodiment shown in FIG. 2, power split planetary 110 is a planetary gear set or planetary device that includes a first rotatable portion, shown as sun gear 112, a second rotatable portion, shown as ring gear 114, and a series of connecting members, shown as planetary gears 116. The series of planetary gears 116 couple sun gear 112 to ring gear 114, according to an exemplary embodiment. As shown in FIG. 2, a carrier 118 rotationally supports the series of planetary gears 116. In one embodiment, first electromagnetic device 40 is directly coupled to sun gear 112 such that power split planetary 110 is coupled to first electromagnetic device 40. By way of example, first electromagnetic device 40 may include a shaft (e.g., a first shaft, an input shaft, an output shaft, etc.) directly coupled to sun gear 112.

Referring still to the exemplary embodiment shown in FIG. 2, output planetary 120 is a planetary gear set or planetary device that includes a first rotatable portion, shown as sun gear 122, a second rotatable portion, shown as ring gear 124, and a series of connecting members, shown as planetary gears 126. The series of planetary gears 126 couple sun gear 122 to ring gear 124, according to an exemplary embodiment. As shown in FIG. 2, a carrier 128 rotationally supports the series of planetary gears 126. In one embodiment, second electromagnetic device 50 is directly coupled to sun gear 122 such that output planetary 120 is coupled to second electromagnetic device 50. By way of example, second electromagnetic device 50 may include a shaft (e.g., a second shaft, an input shaft, an output shaft, etc.) directly coupled to sun gear 122. Carrier 118 is directly coupled to carrier 128, thereby coupling power split planetary 110 to output planetary 120, according to the exemplary embodiment shown in FIG. 2. In one embodiment, directly coupling carrier 118 to carrier 128 synchronizes the rotational speeds of carrier 118 and carrier 128.

According to an exemplary embodiment, transmission 30 includes a first clutch, shown as power split coupled clutch 130. In one embodiment, power split coupled clutch 130 is positioned downstream of power split planetary 110 (e.g., between power split planetary 110 and front axle driveshaft 66 or rear axle driveshaft 76, etc.). As shown in FIG. 2, power split coupled clutch 130 is positioned to selectively couple power split planetary 110 and output planetary 120 with a shaft, shown as output shaft 32. In one embodiment, power split coupled clutch 130 allows a vehicle to be towed without spinning the components within transmission 30 (e.g., power split planetary 110, output planetary 120, etc.). Output shaft 32 may be coupled to rear axle driveshaft 76 and selectively coupled to front axle driveshaft with a declutch assembly, shown as front de-couple collar shift 34. Front de-couple collar shift 34 may be engaged and disengaged to selectively couple front axle driveshaft 66 to output shaft 32 of transmission 30 (e.g., to facilitate operation of a vehicle in a rear-wheel-drive-only mode, an all-wheel-drive mode, a four-wheel-drive mode, etc.).

As shown in FIG. 2, transmission 30 includes a second clutch, shown as PTO clutch 140. PTO clutch 140 is positioned to selectively couple second electromagnetic device 50 with accessory 80 through PTO output 82, according to an exemplary embodiment. PTO clutch 140 may thereby selectively couple accessory 80 and PTO output 82 to output planetary 120. As shown in FIG. 2, transmission 30 includes a shaft, shown as connecting shaft 36, coupled to PTO output 82. According to an exemplary embodiment, connecting shaft 36 extends from PTO output 82, through second electromagnetic device 50, and through output planetary 120 to power split planetary 110. Connecting shaft 36 couples PTO output 82 with power split planetary 110, according to the exemplary embodiment shown in FIG. 2. In one embodiment, connecting shaft 36 directly couples PTO output 82 with ring gear 114 of power split planetary 110. PTO clutch 140 may selectively couple second electromagnetic device 50 with connecting shaft 36. According to an exemplary embodiment, the shaft (e.g., input/output shaft, etc.) of first electromagnetic device 40 and the shaft (e.g., input/output shaft, etc.) of second electromagnetic device 50 are radially aligned with power split planetary 110, output planetary 120, connecting shaft 36, and PTO output 82 (e.g., centerlines thereof are aligned, etc.). As shown in FIG. 2, transmission 30 includes a third clutch, shown as output coupled clutch 150. Output coupled clutch 150 is positioned to selectively couple output planetary 120 with output shaft 32, according to an exemplary embodiment. In one embodiment, output shaft 32 is radially offset from power split planetary 110, output planetary 120, and connecting shaft 36 (e.g., radially offset from centerlines thereof, etc.).

Referring again to the exemplary embodiment shown in FIG. 2, transmission 30 includes brake, shown as output brake 170. Output brake 170 is positioned to selectively inhibit the movement of at least a portion of output planetary 120 (e.g., ring gear 124, etc.), according to an exemplary embodiment. In one embodiment, output brake 170 is biased into an engaged position (e.g., with a spring, etc.) and selectively disengaged (e.g., with application of pressurized hydraulic fluid, etc.). In other embodiments, output brake 170 is hydraulically-biased and spring released. In still other embodiments, the components of transmission 30 are still otherwise engaged and disengaged (e.g., pneumatically, etc.). By way of example, output brake 170 and output coupled clutch 150 may be engaged simultaneously to function as a driveline brake (e.g., a braking mechanism to slow down a vehicle, etc.).

As shown in FIG. 2, transmission 30 includes a gear set 180 that couples carrier 118 and carrier 128 to output shaft 32. In one embodiment, gear set 180 includes a first gear, shown as gear 182, in meshing engagement with a second gear, shown as gear 184. As shown in FIG. 2, gear 182 is rotatably coupled to carrier 118 and carrier 128. By way of example, gear 182 may be fixed to a component (e.g., shaft, tube, etc.) that couples carrier 118 and carrier 128. As shown in FIG. 2, power split coupled clutch 130 is positioned to selectively couple gear 184 with output shaft 32 when engaged. With power split coupled clutch 130 disengaged, relative movement (e.g., rotation, etc.) may occur between gear 184 and output shaft 32.

According to an exemplary embodiment, transmission 30 includes a gear set, shown as gear set 190, that couples output planetary 120 to output shaft 32. As shown in FIG. 2, gear set 190 includes a first gear, shown as gear 192, coupled to ring gear 124 of output planetary 120. Gear 192 is in meshing engagement with a second gear, shown as gear 194, according to an exemplary embodiment. As shown in FIG. 2, gear 194 is coupled to a third gear, shown as gear 196. In other embodiments, gear 192 is directly coupled with gear 196. By way of example, gear set 190 may not include gear 194, and gear 192 may be directly coupled to (e.g., in meshing engagement with, etc.) gear 196. As shown in FIG. 2, output coupled clutch 150 is positioned to selectively couple gear 196 with output shaft 32 when engaged. With output coupled clutch 150 disengaged, relative movement (e.g., rotation, etc.) may occur between gear 196 and output shaft 32. By way of example, output coupled clutch 150 may be engaged to couple ring gear 124 to output shaft 32. Output brake 170 is positioned to selectively limit the movement of gear 192 when engaged to thereby also limit the movement of ring gear 124, gear 194, and gear 196.

Figure 3:
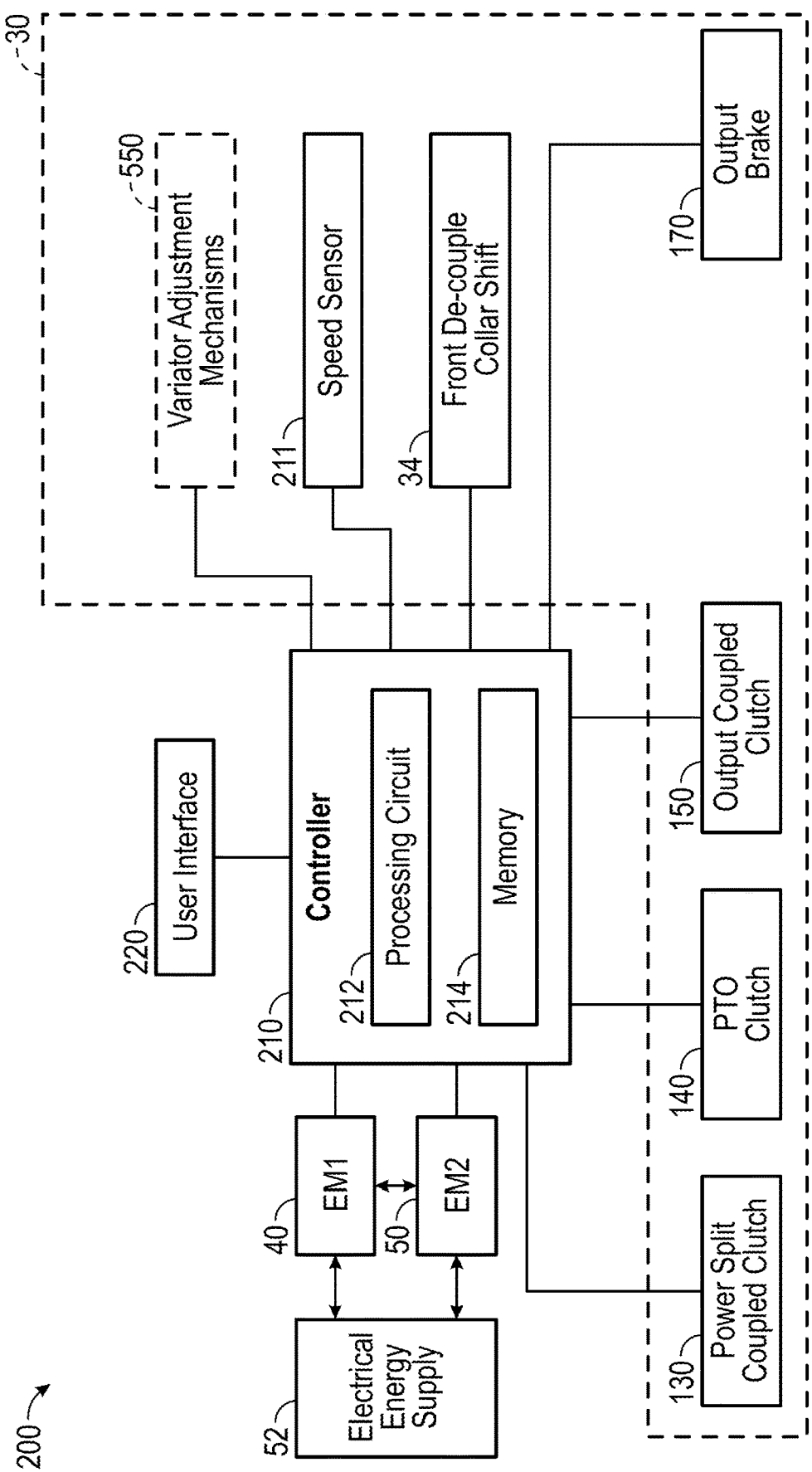
FIG. 3 is a schematic diagram of a control system for the drive train of FIG. 1, according to an exemplary embodiment.

According to the exemplary embodiment shown in FIG. 3, a control system 200 for a vehicle includes a controller 210. In one embodiment, controller 210 is configured to selectively engage, selectively disengage, or otherwise communicate with components of vehicle 10 according to various modes of operation. Controller 210 is coupled to first electromagnetic device 40 and second electromagnetic device 50, according to an exemplary embodiment, and may send and receive signals therewith. By way of example, controller 210 may send command signals relating to at least one of a target rotational speed, a target torque, and a target rotation direction for first electromagnetic device 40 and second electromagnetic device 50.

As shown in FIG. 3, first electromagnetic device 40 and second electromagnetic device 50 are electrically coupled (e.g., through an electrical connection provided by a bus). By way of example, power generated by first electromagnetic device 40 (e.g., in response to a rotational input from PTO output 82 through transmission 30, etc.) may be utilized by second electromagnetic device 50 (e.g., to provide an output torque as a motor, etc.), or power generated by second electromagnetic device 50 may be utilized by first electromagnetic device 40 (e.g., to provide an output torque as a motor, etc.). First electromagnetic device 40 and second electromagnetic device 50 are both electrically coupled to electrical energy supply 52. By way of example, power generated by first electromagnetic device 40 and/or second electromagnetic device 50 may be stored within electrical energy supply 52, or power stored and/or generated within electrical energy supply 52 may be utilized by first electromagnetic device 40 and/or second electromagnetic device 50 (e.g., to provide an output torque as a motor, etc.).

According to the exemplary embodiment shown in FIG. 3, control system 200 includes a user interface 220 that is coupled to controller 210. In one embodiment, user interface 220 includes a display and an operator input. The display may be configured to display a graphical user interface, an image, an icon, or still other information. In one embodiment, the display includes a graphical user interface configured to provide general information about the vehicle (e.g., vehicle speed, fuel level, warning lights, etc.). The graphical user interface may also be configured to display a current mode of operation, various potential modes of operation, or still other information relating to transmission 30, accessory 80, or drive system 100. By way of example, the graphical user interface may be configured to provide specific information regarding the operation of drive system 100 (e.g., whether power split coupled clutch 130, PTO clutch 140, output coupled clutch 150, and output brake 170 are engaged or disengaged, a fault condition where at least one of power split coupled clutch 130, PTO clutch 140, output coupled clutch 150, and output brake 170 fail to engage or disengage in response to a command signal, etc.). By way of another example, the graphical user interface may be configured to provide specific information regarding accessory 80 (e.g., whether an accessory is connected, what type of accessory is connected, status information for the accessory, etc.).

The operator input may be used by an operator to provide commands to at least one of transmission 30, first electromagnetic device 40, second electromagnetic device 50, accessory 80, and drive system 100 or still another component of the vehicle. The operator input may include one or more buttons, knobs, touchscreens, switches, levers, or handles. In one embodiment, an operator may press a button to change the mode of operation for at least one of transmission 30, and drive system 100, and the vehicle. The operator may be able to manually control some or all aspects of the operation of transmission 30 using the display and the operator input. The operator input may also control operation of accessory 80 (e.g., by controlling one or more valves, by selectively supplying electrical energy to one or more components, by engaging or disengaging one or more clutches, etc.). In should be understood that any type of display or input controls may be implemented with the systems and methods described herein.

As shown in FIGS. 2 and 3, control system 200 further includes a rotational speed sensor, shown as speed sensor 211, coupled to output shaft 32 within transmission 30. Speed sensor 211 may be an optical encoder, a Hall Effect gear tooth sensor, or any other type of sensor capable of detecting a rotational speed. Speed sensor 211 is configured to provide the rotational speed of output shaft 32 to controller 210. As output shaft 32 drives front wheels 62 and/or rear wheels 72, controller 210 may be configured to use the rotational speed of output shaft 32 to determine a speed of vehicle 10 (e.g., a speed of travel of vehicle 10).

Controller 210 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 3, controller 210 includes a processing circuit 212 and a memory 214. Processing circuit 212 may include an ASIC, one or more FPGAs, a DSP, circuits containing one or more processing components, circuitry for supporting a microprocessor, a group of processing components, or other suitable electronic processing components. In some embodiments, processing circuit 212 is configured to execute computer code stored in memory 214 to facilitate the activities described herein. Memory 214 may be any volatile or non-volatile computer-readable storage medium capable of storing data or computer code relating to the activities described herein. According to an exemplary embodiment, memory 214 includes computer code modules (e.g., executable code, object code, source code, script code, machine code, etc.) configured for execution by processing circuit 212. Memory 214 includes various actuation profiles corresponding to modes of operation (e.g., for transmission 30, for drive system 100, for accessory 80, for a vehicle, etc.), according to an exemplary embodiment. In some embodiments, controller 210 may represent a collection of processing devices (e.g., servers, data centers, etc.). In such cases, processing circuit 212 represents the collective processors of the devices, and memory 214 represents the collective storage devices of the devices.

Referring next to the exemplary embodiments shown in FIGS. 4-10, transmission 30 is configured to operate according to a series of different modes of operation. Various modes of operation for transmission 30 are identified below in Table 1. In other embodiments, a vehicle having transmission 30 is configured to operate according to the various modes of operation shown in FIGS. 4-10 and identified below in Table 1.

TABLE 1

| Mode of Operation | Power Split Coupled Clutch 130 | Output Coupled Clutch 150 | Output Brake 170 | PTO Clutch 140 |
|---|---|---|---|---|
| Mid Speed Reverse | X | | X | |
| Low Speed Reverse | X | X | | |
| Active Neutral | | | X | X |
| Low Range | X | X | | |
| Mid Range | X | | X | |
| Shift | X | | X | X |
| High Range | X | | | X |

As shown in Table 1, an "X" represents a component of drive system 100 (e.g., output brake 170, power split coupled clutch 130, etc.) that is engaged or closed during the respective modes of operation. In one embodiment, all of the components in Table 1 are disengaged to selectively reconfigure transmission 30 in a neutral mode.

Figure 4:
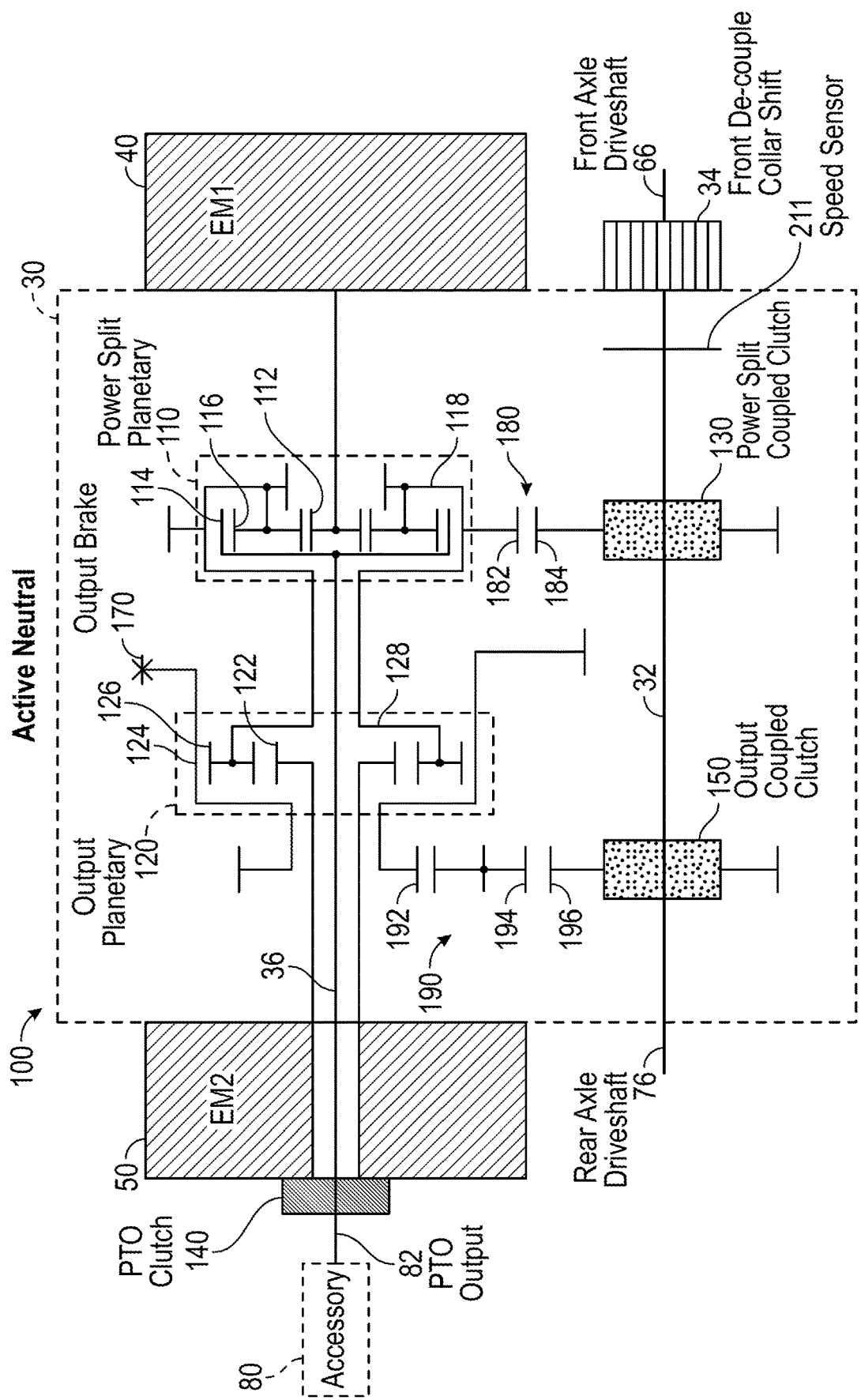
FIG. 4 is a detailed schematic view of the drive train of FIG. 2 configured in an active neutral mode of operation.

As shown in FIG. 4, transmission 30 is selectively reconfigured into an active neutral mode of operation (e.g., a PTO only mode of operation, etc.). Controller 210 may selectively configure transmission 30 into the active neutral mode of operation from a passive neutral mode of operation (e.g., a mode whereby power split coupled clutch 130, PTO clutch 140, output coupled clutch 150, and output brake 170 are disengaged such that first electromagnetic device 40 and second electromagnetic device 50 can rotate without rotating PTO output 82 or output shaft 32, etc.). In one embodiment, controller 210 first selectively configures transmission 30 into the passive neutral mode of operation (e.g., by disengaging power split coupled clutch 130, PTO clutch 140, output coupled clutch 150, and output brake 170) and thereafter selectively configures transmission 30 into the active neutral mode of operation in response to a request to use accessory 80. Transmission 30 may be reconfigured into the passive neutral mode of operation at various times during the operation of the vehicle (e.g., when entering a park mode of operation from a driving mode of operation, in order to tow the vehicle, etc.).

In one embodiment, rotation of first electromagnetic device 40 rotates PTO output 82 to power accessory 80. By way of example, first electromagnetic device 40 may be configured to use the electrical energy from electrical energy supply 52 and provide a rotational mechanical energy input (e.g., a torque, etc.) to PTO output 82 through power split planetary 110 and connecting shaft 36. In another embodiment, rotation of second electromagnetic device 50 rotates PTO output 82 (e.g., where PTO clutch 140 is engaged, etc.) to power accessory 80. By way of example, second electromagnetic device 50 may be configured to use the electrical energy from electrical energy supply 52 and provide a rotational mechanical energy input (e.g., a torque, etc.) to PTO output 82 through the engagement of PTO clutch 140 with connecting shaft 36. In yet another embodiment, simultaneous rotation of both first electromagnetic device 40 and second electromagnetic device 50 rotates connecting shaft to power accessory 80.

As shown in FIG. 4 and Table 1, PTO clutch 140 and output brake 170 are engaged when transmission 30 is configured in the active neutral mode. As shown in FIG. 4, PTO clutch 140 directly couples second electromagnetic device 50 to connecting shaft 36 and PTO output 82. Output brake 170 rotationally fixes ring gear 124. According to the exemplary embodiment shown in FIG. 4, a first energy flow path for the active neutral mode includes: electrical energy supply 52 providing electrical energy to first electromagnetic device 40; first electromagnetic device 40 using the electrical energy and providing a rotational mechanical energy input to sun gear 112 that is received by the series of planetary gears 116; the series of planetary gears 116 conveying the rotational mechanical energy to ring gear 114; and ring gear 114 transferring the rotational mechanical energy to connecting shaft 36 such that the rotational mechanical energy provided by first electromagnetic device 40 rotates PTO output 82. A second energy flow path for the active neutral mode includes: electrical energy supply 52 providing electrical energy to second electromagnetic device 50; and second electromagnetic device 50 using the electrical energy and providing a rotational mechanical energy input to connecting shaft 36 through PTO clutch 140 such that the rotational mechanical energy rotates PTO output 82. The first and second energy flow paths may occur independently (e.g., by running only one electromagnetic device at one time) or simultaneously.

In an alternative to the active neutral mode of operation, only PTO clutch 140 engaged, coupling second electromagnetic device 50 to PTO output 82. This alternative mode of operation would utilize the second energy flow path, which includes: electrical energy supply 52 providing electrical energy to second electromagnetic device 50; and second electromagnetic device 50 using the electrical energy and providing a rotational mechanical energy input to connecting shaft 36 through PTO clutch 140 such that the rotational mechanical energy rotates PTO output 82.

In some embodiments, these energy flow paths may be followed in a reverse sequence to generate electrical energy. By way of example, second electromagnetic device 50 may be used to apply a braking torque on PTO output 82. In such an example, rotational mechanical energy is transferred from PTO output 82 to second electromagnetic device 50 through connecting shaft 36 and PTO clutch 140. Second electromagnetic device 50 removes rotational mechanical energy from PTO clutch 140 and generates electrical energy to charge electrical energy supply 52. By way of another example, first electromagnetic device 40 may be used to apply a braking torque on PTO output 82. In such an example, rotational mechanical energy is transferred from PTO output 82 to first electromagnetic device 40 through connecting shaft 36 and power split planetary 110. First electromagnetic device 40 removes rotational mechanical energy from sun gear 112 and generates electrical energy to charge electrical energy supply 52.

According to the exemplary embodiment shown in FIG. 4, engaging PTO clutch 140 rotates second electromagnetic device 50 at the rotational speed of connecting shaft 36. Connecting shaft 36 may rotate at the same speed as PTO output 82 such that PTO output 82 and second electromagnetic device 50 operate at a 1:1 speed ratio. According to the exemplary embodiment shown in FIG. 4, engaging PTO clutch 140 and output brake 170 rotates carrier 118 (e.g., through output planetary 120, etc.) while ring gear 114 rotates with connecting shaft 36. Engaging PTO clutch 140 and output brake 170 may drive first electromagnetic device 40 at a rotational speed that is related to the rotational speed of carrier 118 and the rotational speed of ring gear 114. In one embodiment, the active neutral mode locks first electromagnetic device 40 and second electromagnetic device 50 in a fixed speed ratio with PTO output 82 (e.g., 1:1 between second electromagnetic device 50 and PTO output 82; 1.06:1 between first electromagnetic device 40 and PTO output 82, etc.).

Referring still to FIG. 4, transmission 30 isolates first electromagnetic device 40 and second electromagnetic device 50 from output shaft 32 during the active neutral mode (e.g., power split coupled clutch 130 and output coupled clutch 150 may be disengaged, etc.). Such isolation may reduce (e.g., substantially eliminate, etc.) a forward lurch potential of vehicle 10 (e.g., transmission 30 does not provide an output torque to tires 62 and/or tires 72 when in the active neutral mode, etc.).

In some embodiments, at least one of PTO clutch 140 and output brake 170 are disengaged to prepare transmission 30 to be selectively reconfigured into a drive mode (e.g., low range, mid range, high range, etc.). By way of example, PTO clutch 140 may be disengaged in response to a command from a user (e.g., through user interface 220) to enter a drive mode. Only power split coupled clutch 130 may need to be engaged to selectively reconfigure transmission 30 into the mid range mode, thereby providing a simple and efficient process by which the vehicle may be shifted into a drive mode and driven. In some embodiments, when preparing to shift modes of operation, controller 210 controls first electromagnetic device 40 and/or second electromagnetic device 50 in a motoring mode where first electromagnetic device 40 and/or second electromagnetic device 50 provide an input torque to transmission 30 and are commanded to operate at a target speed. Such a speed may be based on the current vehicle speed (e.g., zero if the vehicle is not moving on flat ground, non-zero if the vehicle is rolling up or down a slope at startup, etc.). Commanding the operation of first electromagnetic device 40 and/or second electromagnetic device 50 may prepare transmission 30 for a shift from the active neutral mode of operation (i.e., a selective reconfiguration, etc.) to another driving mode of operation (e.g., a mid range mode of operation, etc.). Such preparation may decrease an inertial jerk on output shaft 32 during the shift.

Figure 5:
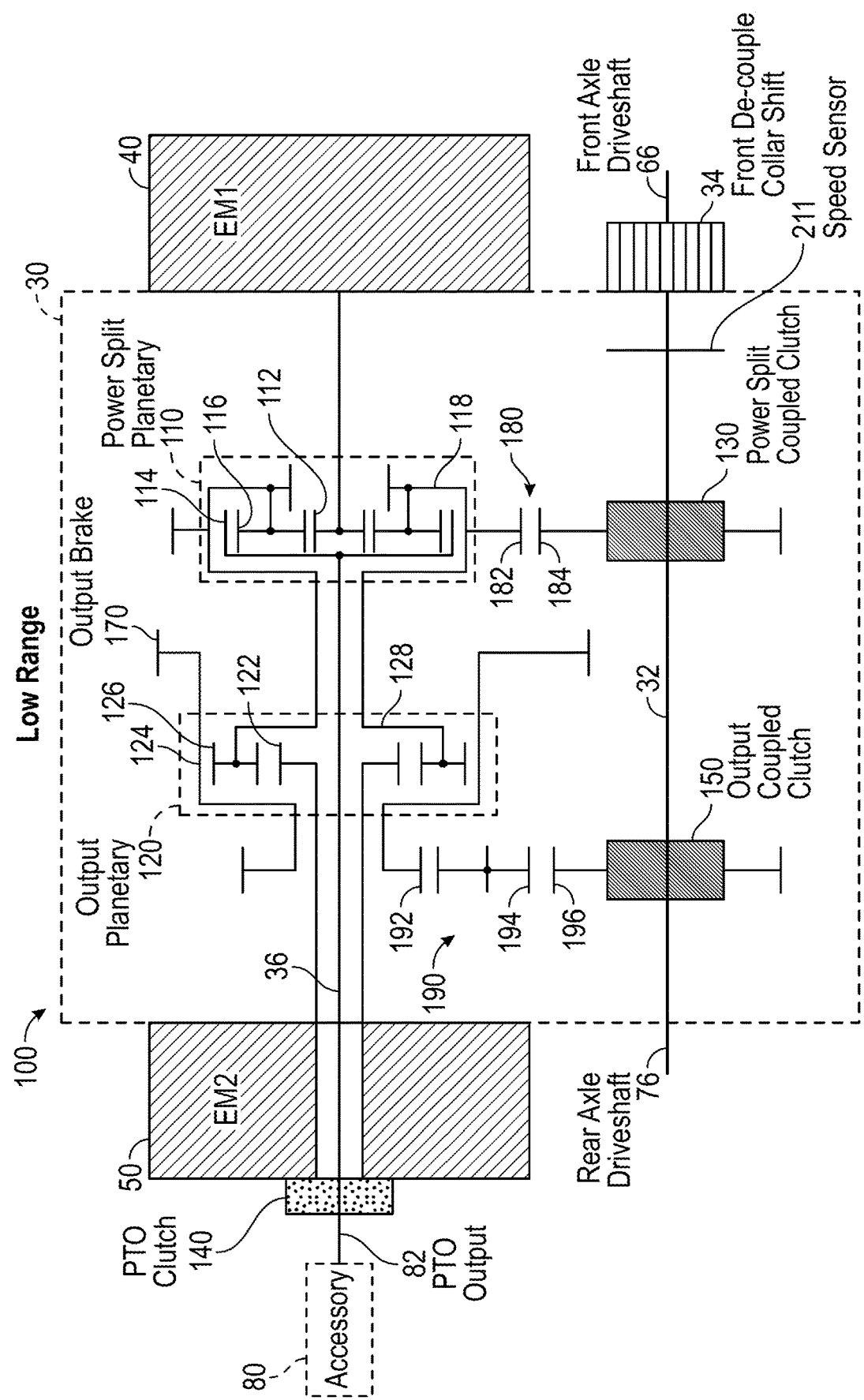
FIG. 5 is a detailed schematic view of the drive train of FIG. 2 configured in a low range mode of operation.

As shown in FIG. 5, transmission 30 is selectively reconfigured into a low range mode of operation such that transmission 30 allows for a low output speed operation with a high output torque. The low range mode increases a vehicle's gradability (e.g., facilitates the vehicle maintaining speed on a grade, etc.). In one embodiment, second electromagnetic device 50 uses the electrical energy from electrical energy supply 52 and provides a rotational mechanical energy input to transmission 30 to drive at least one of tires 62 and tires 72. The rotational mechanical energy input from second electromagnetic device 50 may additionally drive PTO output 82. In another embodiment, first electromagnetic device 40 uses the electrical energy from electrical energy supply 52 and provides a rotational mechanical energy input to transmission 30 to drive at least one of tires 62, tires 72, and PTO output 82 in the low range mode. In another embodiment, both first electromagnetic device 40 and second electromagnetic device provide a rotational mechanical energy input to transmission 30 in the low range mode. In still another alternative embodiment, one or both of first electromagnetic device 40 and second electromagnetic device 50 operate as a generator in the low range mode.

In some embodiments, while in the low range mode, first electromagnetic device 40 only provides rotational mechanical energy when it is desired to operate accessory 80. Upon receiving a request to operate accessory 80, first electromagnetic device 40 provides rotational mechanical energy to drive PTO output 82. First electromagnetic device 40 may begin providing rotational mechanical energy to output shaft 32 when transmission 30 is transitioned into another mode of operation (e.g., the mid range mode, the high range mode, etc.). In other embodiments, when vehicle 10 is traveling at less than a threshold speed (e.g., as measured using speed sensor 211), first electromagnetic device 40 only provides rotational mechanical energy when it is desired to operate accessory 80. Upon receiving a request to operate accessory 80, first electromagnetic device 40 provides rotational mechanical energy to drive PTO output 82. First electromagnetic device 40 may begin providing rotational mechanical energy to output shaft 32 when the vehicle reaches the threshold speed. In yet other embodiments, first electromagnetic device 40 provides rotational mechanical energy to drive output shaft 32 and/or accessory 80 when first electromagnetic device 40 is in the low range mode and/or regardless of the speed of the vehicle.

As shown in FIG. 5 and Table 1, power split coupled clutch 130 and output coupled clutch 150 are engaged when transmission 30 is configured in the low range mode. As shown in FIG. 5, power split coupled clutch 130 and output coupled clutch 150 couple gear set 180 and gear set 190 to output shaft 32, respectively. Accordingly, when first electromagnetic device 40 and/or second electromagnetic device 50 provide a rotational mechanical energy input to transmission 30, both power split planetary 110 and output planetary 120 drive output shaft 32 through gear set 180 and gear set 190, respectively. According to the exemplary embodiment shown in FIG. 5, an exemplary energy flow path for the low range includes: second electromagnetic device 50 receiving electrical energy from electrical energy supply 52; second electromagnetic device 50 operating as a motor, providing a rotational mechanical energy input to sun gear 122; sun gear 122 causing the series of planetary gears 126 to rotate about central axes thereof, as well as about sun gear 122 such that both carrier 128 and ring gear 124 rotate; the rotation of ring gear 124 driving gear set 190. The rotation of carrier 128 drives both carrier 118 and gear set 180. According to the exemplary embodiment shown in FIG. 5, gear set 180 and gear set 190 transfer a torque to and from output shaft 32 with power split coupled clutch 130 and output coupled clutch 150 engaged. As such, second electromagnetic device 50 moves a vehicle at a low speed with a high output torque. This energy flow path may additionally include: carrier 118 causing the series of planetary gears 116 to rotate about central axes thereof, as well as about sun gear 112 such that ring gear 114 rotates; ring gear 114 providing a rotational mechanical energy input to connecting shaft 36; and connecting shaft 36 conveying the rotational mechanical energy to PTO output 82 to drive accessory 80

According to the exemplary embodiment shown in FIG. 5, a second exemplary energy flow path for the low range includes: first electromagnetic device 40 receiving electrical energy from electrical energy supply 52; first electromagnetic device 40 operating as a motor, providing a rotational mechanical energy input to sun gear 112; sun gear 112 causing the series of planetary gears 116 to rotate about central axes thereof, such that ring gear 114 rotates; ring gear 114 providing a rotational mechanical energy input to connecting shaft 36; and connecting shaft 36 conveying the rotational mechanical energy to PTO output 82 to drive accessory 80. This energy flow path may additionally or alternatively include the series of planetary gears 116 rotating about sun gear 112 such that carrier 118 and gear set 180 rotate. According to the exemplary embodiment shown in FIG. 5, gear set 180 transfers a torque to and from output shaft 32 with power split coupled clutch 130 and output coupled clutch 150 engaged. As such, first electromagnetic device 40 moves a vehicle at a low speed with a high output torque.

In some embodiments, second electromagnetic device 50 is coupled to output shaft 32 at a fixed ratio through output planetary 120, gear set 190, and output coupled clutch 150 during the low range mode. Accordingly, the rotational speed of output shaft 32 may be entirely dependent on the rotational speed of second electromagnetic device 50. The speed of PTO output 82 is dependent on the relative rotational speed between first electromagnetic device 40 and second electromagnetic device 50. In the low range mode, first electromagnetic device 40 controls the speed of sun gear 112, and second electromagnetic device 50 controls the speed of carrier 118. Depending on the relative rotational speeds and directions of sun gear 112 and carrier 118, the series of planetary gears 116 cause ring gear 114, and thus PTO output 82, to rotate at different speeds and in different directions. Accordingly, the relative rotational speed and direction of first electromagnetic device 40 and second electromagnetic device 50 may be varied to cause first electromagnetic device 40 to drive PTO output 82, output shaft 32, or both, and second electromagnetic device 50 to drive output shaft 32 or both output shaft 32 and PTO output 82.

In some embodiments, these energy flow paths may be followed in a reverse sequence to generate electrical energy. By way of example, second electromagnetic device 50 may be used to apply a braking torque on output shaft 32. In such an example, rotational mechanical energy is transferred from output shaft 32 to second electromagnetic device 50 through output coupled clutch 150, gear set 190, and output planetary 120. Second electromagnetic device 50 removes rotational mechanical energy from sun gear 122 and generates electrical energy to charge electrical energy supply 52 or power first electromagnetic device 40. By way of another example, first electromagnetic device may be used to apply a braking torque on PTO output 82. In such an example, rotational mechanical energy is transferred from PTO output 82 to first electromagnetic device 40 through connecting shaft 36 and power split planetary 110. First electromagnetic device 40 removes rotational mechanical energy from sun gear 112 and generates electrical energy to charge electrical energy supply 52 or power second electromagnetic device 50.

Figure 6:
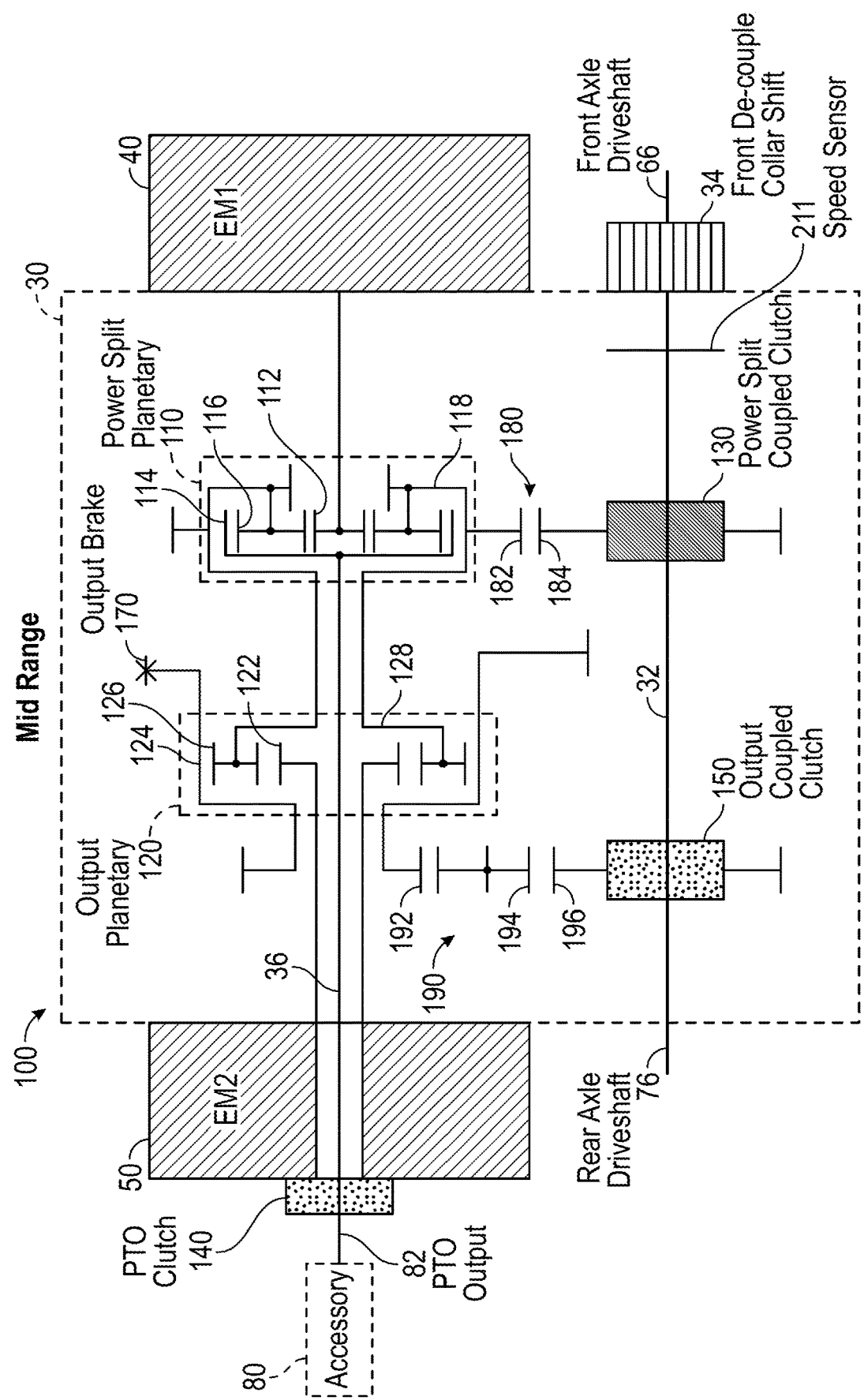
FIG. 6 is a detailed schematic view of the drive train of FIG. 2 configured in a mid range mode of operation.

As shown in FIG. 6, transmission 30 is selectively reconfigured into a mid range mode of operation such that transmission 30 allows for a mid range output speed operation. The mid range mode may improve low output speed torque and high output speed power. In one embodiment, second electromagnetic device 50 uses the electrical energy from electrical energy supply 52 and provides a rotational mechanical energy input to transmission 30 to drive at least one of tires 62 and tires 72. The rotational mechanical energy input from second electromagnetic device 50 may additionally drive PTO output 82. In another embodiment, first electromagnetic device 40 uses the electrical energy from electrical energy supply 52 and provides a rotational mechanical energy input to transmission 30 to drive at least one of tires 62, tires 72, and PTO output 82 in the mid range mode. In another embodiment, both first electromagnetic device 40 and second electromagnetic device provide a rotational mechanical energy input to transmission 30 in the mid range mode. In still another alternative embodiment, one or both of first electromagnetic device 40 and second electromagnetic device 50 operate as a generator in the mid range mode.

As shown in FIG. 6 and Table 1, power split coupled clutch 130 and output brake 170 are engaged when transmission 30 is configured in the mid range mode. As shown in FIG. 6, output brake 170 inhibits the rotation of gear set 190 (e.g., gear 192, gear 194, gear 196, etc.) and rotationally fixes ring gear 124. In one embodiment, engaging output brake 170 substantially eliminates a power dip between output and input modes of transmission 30. According to the exemplary embodiment shown in FIG. 6, an energy flow path for the mid range mode includes: second electromagnetic device 50 receiving electrical energy from electrical energy supply 52; second electromagnetic device 50 operating as a motor, providing a rotational mechanical energy input to sun gear 122; sun gear 122 causing the series of planetary gears 126 to rotate about central axes thereof, as well as about sun gear 122 such that carrier 128 rotates; and the rotation of carrier 128 driving both carrier 118 and gear set 180. As shown in FIG. 6, power split coupled clutch 130 couples gear set 180 to output shaft 32 such that the rotational mechanical energy of gear set 180, received from second electromagnetic device 50, drives output shaft 32 at a mid range output speed and may thereby drive a vehicle at a mid range output speed. The energy flow path may additionally include: carrier 118 causing the series of planetary gears 116 to rotate about central axes thereof, as well as about sun gear 112 such that ring gear 114 rotates; ring gear 114 providing a rotational mechanical energy input to connecting shaft 36; and connecting shaft 36 conveying the rotational mechanical energy to PTO output 82 to drive accessory 80.

According to the exemplary embodiment shown in FIG. 6, a second exemplary energy flow path for the mid range includes: first electromagnetic device 40 receiving electrical energy from electrical energy supply 52; first electromagnetic device 40 operating as a motor, providing a rotational mechanical energy input to sun gear 112; sun gear 112 causing the series of planetary gears 116 to rotate about central axes thereof, such that ring gear 114 rotates; ring gear 114 providing a rotational mechanical energy input to connecting shaft 36; and connecting shaft 36 conveying the rotational mechanical energy to PTO output 82 to drive accessory 80. This energy flow path may additionally or alternatively include the series of planetary gears 116 rotating about sun gear 112 such that carrier 118 and gear set 180 rotate. As shown in FIG. 6, power split coupled clutch 130 couples gear set 180 to output shaft 32 such that the rotational mechanical energy of gear set 180, received from first electromagnetic device 40, drives output shaft 32 at a mid range output speed and may thereby drive a vehicle at a mid range output speed.

In some embodiments, second electromagnetic device 50 is coupled to output shaft 32 at a fixed ratio through output planetary 120, power split planetary 110, gear set 180, and power split coupled clutch 130 during the mid range mode. Accordingly, the rotational speed of output shaft 32 may be entirely dependent on the rotational speed of second electromagnetic device 50. The speed of PTO output 82 is dependent on the relative rotational speed between first electromagnetic device 40 and second electromagnetic device 50. In the mid range mode, first electromagnetic device 40 controls the speed of sun gear 112, and second electromagnetic device 50 controls the speed of carrier 118. Depending on the relative rotational speeds and directions of sun gear 112 and carrier 118, the series of planetary gears 116 cause ring gear 114, and thus PTO output 82, to rotate at different speeds and in different directions. Accordingly, the relative rotational speed and direction of first electromagnetic device 40 and second electromagnetic device 50 may be varied to cause first electromagnetic device 40 to drive PTO output 82, output shaft 32, or both, and second electromagnetic device 50 to drive output shaft 32 or both output shaft 32 and PTO output 82.

In some embodiments, these energy flow paths may be followed in reverse to generate electrical energy. By way of example, second electromagnetic device 50 may be used to apply a braking torque on output shaft 32. In such an example, rotational mechanical energy is transferred from output shaft 32 to second electromagnetic device 50 through power split coupled clutch 130, gear set 180, power split planetary 110, and output planetary 120. Second electromagnetic device 50 removes rotational mechanical energy from sun gear 122 and generates electrical energy to charge electrical energy supply 52 or power first electromagnetic device 40. By way of another example, first electromagnetic device may be used to apply a braking torque on PTO output 82. In such an example, rotational mechanical energy is transferred from PTO output 82 to first electromagnetic device 40 through connecting shaft 36 and power split planetary 110. First electromagnetic device 40 removes rotational mechanical energy from sun gear 112 and generates electrical energy to charge electrical energy supply 52 or power second electromagnetic device 50.

Figure 7:
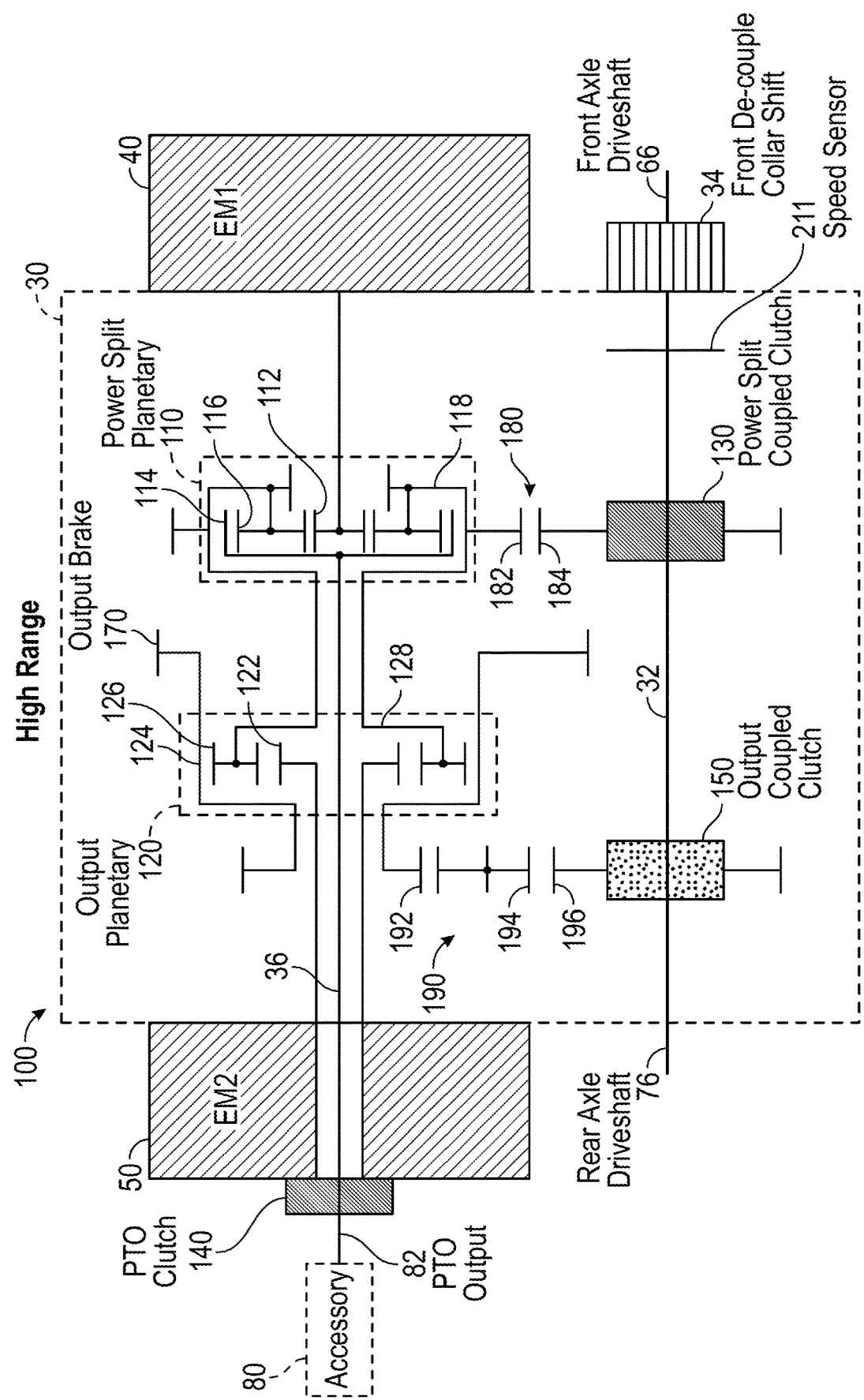
FIG. 7 is a detailed schematic view of the drive train of FIG. 2 configured in a high range mode of operation.

As shown in FIG. 7, transmission 30 is selectively reconfigured into a high range mode of operation such that transmission 30 allows for a high output speed operation. In one embodiment, second electromagnetic device 50 uses the electrical energy from electrical energy supply 52 and provides a rotational mechanical energy input to transmission 30 to drive PTO output 82 and at least one of tires 62 and tires 72. In another embodiment, first electromagnetic device 40 uses the electrical energy from electrical energy supply 52 and provides a rotational mechanical energy input to transmission 30 to drive at least one of tires 62, tires 72, and PTO output 82 in the high range mode. In another embodiment, both first electromagnetic device 40 and second electromagnetic device provide a rotational mechanical energy input to transmission 30 in the high range mode. In still another alternative embodiment, one or both of first electromagnetic device 40 and second electromagnetic device 50 operate as a generator in the high range mode.

As shown in FIG. 7 and Table 1, power split coupled clutch 130 and PTO clutch 140 are engaged when transmission 30 is configured in the high range mode. As shown in FIG. 7, the engagement of PTO clutch 140 with connecting shaft 36 rotationally couples second electromagnetic device 50 and PTO output 82. By way of example, second electromagnetic device 50 may use electrical energy from electrical energy supply 52 and provide a rotational mechanical energy input to connecting shaft 36 such to drive PTO output 82. PTO output 82 may also be driven by first electromagnetic device 40 in the high range mode. By way of example, first electromagnetic device 40 may use electrical energy from electrical energy supply 52 and provide a rotational mechanical energy input to sun gear 112 that drives ring gear 114 through planetary gears 116. Ring gear 114 transfers rotational mechanical energy to connecting shaft 36, which drives PTO output 82.

Referring to FIG. 7, in one embodiment, both first electromagnetic device 40 and second electromagnetic device receive electrical energy from electrical energy supply 52 and provide rotational mechanical energy to transmission 30 to drive output shaft 32. First electromagnetic device 40 operates as a motor, providing a rotational mechanical energy input to sun gear 112 that drives the series of planetary gears 116 and carrier 118. Second electromagnetic device 50 also acts as a motor. Rotational mechanical energy from second electromagnetic device 50 is transferred to the series of planetary gears 116 through connecting shaft 36 and ring gear 114. The series of planetary gears 116 are driven by both second electromagnetic device 50 (e.g., through ring gear 114, etc.) and first electromagnetic device 40 (e.g., through sun gear 112, etc.). Carrier 118 rotates, which drives gear set 180. As shown in FIG. 7, power split coupled clutch 130 couples gear set 180 to output shaft 32 such that the rotational mechanical energy provided by first electromagnetic device 40 and second electromagnetic device drives a vehicle at a high range speed.

In some embodiments, second electromagnetic device 50 is coupled to PTO output 82 at a fixed ratio (e.g., 1:1) through PTO clutch 140 and connecting shaft 36 during the high range mode. Accordingly, the rotational speed and direction of PTO output 82 may be entirely dependent on the rotational speed of second electromagnetic device 50. The speed of output shaft 32 is dependent on the relative rotational speed between first electromagnetic device 40 and second electromagnetic device 50. In the high range mode, first electromagnetic device 40 controls the speed of sun gear 112, and second electromagnetic device 50 controls the speed of ring gear 114. Depending on the relative rotational speeds and directions of sun gear 112 and ring gear 114, the series of planetary gears 116 cause carrier 118, and thus output shaft 32, to rotate at different speeds and in different directions.

In some embodiments, these energy flow paths may be followed in reverse to generate electrical energy. By way of example, first electromagnetic device 40 and second electromagnetic device 50 may be used to apply a braking torque on output shaft 32. In such an example, rotational mechanical energy is transferred from output shaft 32 to second electromagnetic device 50 through power split coupled clutch 130, gear set 180, power split planetary 110, connecting shaft 36, and PTO clutch 140. Rotational mechanical energy is transferred from output shaft 32 to first electromagnetic device 40 through power split coupled clutch 130, gear set 180, and power split planetary 110. First electromagnetic device 40 and second electromagnetic device 50 remove rotational mechanical energy from sun gear 112 and connecting shaft 36, respectively, and generate electrical energy to charge electrical energy supply 52. By way of another example, second electromagnetic device 50 may be used to apply a braking torque on PTO output 82. In such an example, rotational mechanical energy is transferred from PTO output 82 to second electromagnetic device 50 through connecting shaft 36 and PTO clutch 140. First electromagnetic device 40 removes rotational mechanical energy from sun gear 112 and generates electrical energy to charge electrical energy supply 52 or power second electromagnetic device 50.

Figure 8:
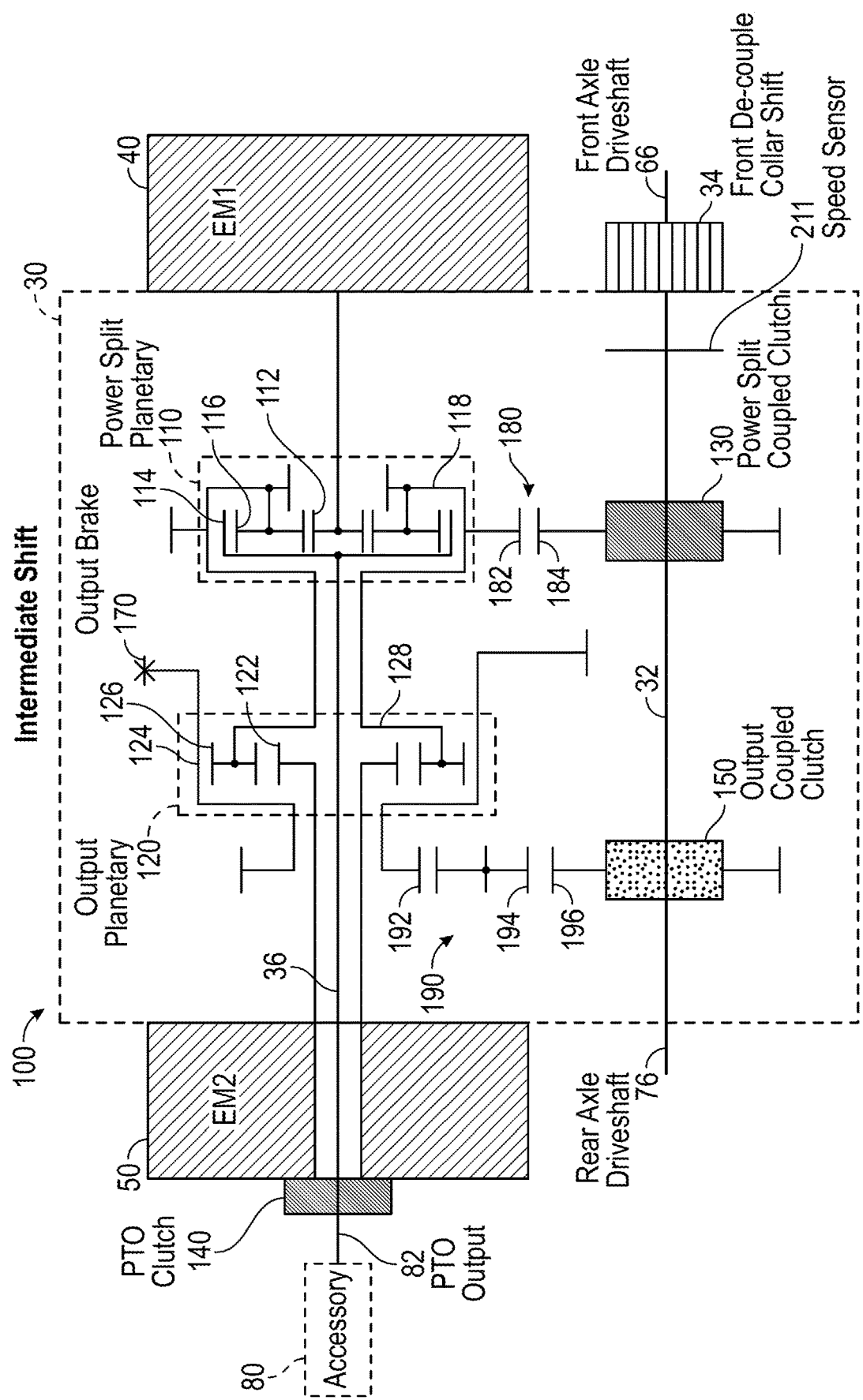
FIG. 8 is a detailed schematic view of the drive train of FIG. 2 configured in an intermediate shift mode of operation.

As shown in FIG. 8, transmission 30 is selectively reconfigured into an intermediate shift mode of operation that facilitates transitioning transmission 30 (i.e., shifting, changing modes, etc.) between the mid range mode of operation and the high range mode of operation. According to the embodiment shown in FIG. 8, PTO clutch 140, power split coupled clutch 130, and output brake 170 are engaged when transmission 30 is selectively reconfigured into the intermediate shift mode of operation. According to an exemplary embodiment, the intermediate shift mode provides a smooth and robust shifting strategy that functions reliably even in a wide variety of operating conditions, when using various types of oil for the components of transmission 30, and when experiencing valve nonlinearities that may be present in one or more valves of transmission 30. The intermediate shift mode may provide a zero inertia shift through and across two or more overlapping ranges (e.g., the mid range and the high range, etc.). According to the exemplary embodiment shown in FIGS. 6-8, the intermediate shift mode eliminates the need to simultaneously disengage output brake 170 and engage PTO clutch 140 to shift from the mid range mode to the high range mode, or vice versa. The intermediate shift mode reduces jerking sensations associated with simultaneously disengaging output brake 170 and engaging PTO clutch 140 to shift from mid range to high range, providing a smoother ride.

During operation, the intermediate shift mode may be used to shift from mid range mode to high range mode or from high range mode to mid range mode. In one embodiment, transmission 30 is configured in the mid range mode of operation with power split coupled clutch 130 and output brake 170 engaged and configured in the high range mode of operation with power split coupled clutch 130 and PTO clutch 140 engaged. Transmission 30 may be selectively reconfigured into the intermediate shift mode in response to the difference between a rotational speed of second electromagnetic device 50 and a rotational speed of connecting shaft 36 falling below or equaling a threshold level (e.g., approximately zero, five revolutions per minute, fifty revolutions per minute, etc.). Transmission 30 may enter the intermediate shift mode when the rotational speed of second electromagnetic device 50 substantially corresponds with (e.g., matches, is substantially equal to, etc.) the rotational speed of connecting shaft 36. In one embodiment, transmission 30 enters the intermediate shift mode when the rotational speeds of second electromagnetic device 50 and connecting shaft 36 are between 1,600 and 1,800 revolutions per minute (RPM). By way of example, transmission 30 may enter the intermediate shift mode when the rotational speeds of second electromagnetic device 50 and connecting shaft 36 are about 1,600 RPM. One or more sensors may be positioned to monitor the rotational speed of at least one of connecting shaft 36, a portion of second electromagnetic device 50, or still another component. A controller (e.g., controller 210, etc.) may reconfigure transmission 30 into the intermediate shift mode in response to sensing signals provided by the one or more sensors.

Shifting into the intermediate shift mode occurs when there is limited (if any) relative movement between clutch disks of PTO clutch 140. Transmission 30 may be reconfigured into the intermediate shift mode without compromising vehicle performance (e.g., since torque is not removed from output shaft 32, etc.). The intermediate shift mode reduces (e.g., minimizes, etc.) heat generation and clutch wear during shifts by limiting the relative movement between clutch disks of PTO clutch 140 upon engagement. The intermediate shift mode may thereby increase clutch life.

In operation, the vehicle may be accelerating in the mid range mode. In one embodiment, second electromagnetic device 50 provides an output torque in the mid range mode of operation and its speed thereby increases with the speed of the vehicle. As the speed of second electromagnetic device 50 continues to increase with vehicle speed, second electromagnetic device 50 may begin to operate at a rotational speed similar to that of connecting shaft 36. Controller 210 may engage PTO clutch 140 to selectively reconfigure transmission 30 into the intermediate shift mode from the mid range mode. The vehicle may alternatively be decelerating in the high range mode. In one embodiment, first electromagnetic device 40 operates as a motor in the high range mode of operation with its speed related to that of connecting shaft 36 and/or the speed of the vehicle. The speed of the vehicle and/or the speed of first electromagnetic device 40 may decrease to a speed designated for the mid range mode. Controller 210 may be configured to utilize the speed of output shaft 32 provided by speed sensor 211 to determine the speed of the vehicle. Controller 210 may engage output brake 170 to selectively reconfigure transmission 30 into the intermediate shift mode from the high range mode.

As shown in FIGS. 6-8, power split coupled clutch 130 is engaged (i.e., is not disengaged, is not open, transfers torque, etc.) in each of the mid range mode, the intermediate shift mode, and the high mode. Transmission 30 having power split coupled clutch 130 engaged in each of these modes facilitates the continuous transfer of power from first electromagnetic device 40 and second electromagnetic device 50 to output shaft 32 during the shift from mid range mode to high range mode. According to an exemplary embodiment, first electromagnetic device 40 and second electromagnetic device 50 are also coupled to output shaft 32 through power split coupled clutch 130 at a fixed ratio during the intermediate shift mode. Maintaining a power path to output shaft 32 during the shift reduces (e.g., eliminates, etc.) jerking associated with shifting traditional transmission systems. In the intermediate shift mode, an acceleration of first electromagnetic device 40 and second electromagnetic device 50 causes an acceleration of the vehicle, and a deceleration of first electromagnetic device 40 and second electromagnetic device 50 causes a deceleration of the vehicle.

Transmission 30 may be configured in the intermediate shift mode for an extended period of time and/or while the vehicle traverses an extended distance. Controller 210 may selectively reconfigure transmission 30 out of the intermediate shift mode (e.g., into the mid range mode of operation, into the high range mode of operation, etc.) automatically in response to at least one of an elapsed shift time (e.g., a time that has elapsed while in the intermediate shift mode, etc.), a traveled shift distance (e.g., a distance the vehicle has traveled while in the intermediate shift mode as determined using speed sensor 211, etc.), a change in speed of connecting shaft 36, the speed of the vehicle (e.g., as determined using speed sensor 211, etc.) exceeding or falling below a threshold vehicle speed, and a request, among other conditions.

In one embodiment, controller 210 transitions transmission 30 out of the intermediate shift mode in response to an indication that the shift has satisfied at least one of a time-based and a distance-based condition. By way of one example, controller 210 may transition transmission 30 out of the intermediate shift mode in response to an indication that transmission 30 has been in the intermediate shift mode for longer than a predetermined period of time. By way of another example, controller 210 may transition transmission 30 out of the intermediate shift mode in response to an indication that the vehicle has traversed more than a threshold distance (e.g., as determined using speed sensor 211).

In another embodiment, controller 210 transitions transmission 30 out of the intermediate shift mode in response to a change in speed of connecting shaft 36. Controller 210 may selectively reconfigure transmission 30 into the high range mode from the intermediate shift mode (e.g., by disengaging output brake 170, etc.) in response to an increase in speed of connecting shaft 36 (e.g., in response to the speed of connecting shaft 36 exceeding a threshold speed, etc.). By way of example, the speed of connecting shaft 36 may increase based on a command (e.g., provided by an operator using an accelerator pedal or another input device, provided by a controller as part of an autonomous operation of the vehicle, etc.) that prompts the speed of connecting shaft 36 to increase. Controller 210 may selectively reconfigure transmission 30 into the mid range mode from the intermediate shift mode (e.g., by disengaging PTO clutch 140, etc.) in response to a decrease in speed of connecting shaft 36 (e.g., in response to the speed of connecting shaft 36 falling below a threshold speed, etc.). By way of example, the speed of connecting shaft 36 may decrease based on a command (e.g., provided by an operator using a brake pedal or another input device, provided by an operator releasing an accelerator pedal or another input device, provided by a controller as part of an autonomous operation of the vehicle, etc.) that prompts the speed of connecting shaft 36 to decrease.

In still another embodiment, controller 210 transitions transmission 30 out of the intermediate shift mode in response to a request. By way of example, the request may come from an operator (e.g., provided by way of a user interface, etc.) and indicate the operator's command to enter either the mid range mode of operation or the high range mode of operation. The request may also be provided by a controller as part of an autonomous operation of the vehicle. Such requests may be provided in order to reenter a mode of operation whereby the vehicle operates more efficiently. Such requests may prompt transmission 30 to complete the shift from the mid range mode of operation to the high range mode of operation, complete the shift from the high range mode of operation to the mid range mode of operation, toggle back into the mid range mode of operation from the intermediate shift mode, and/or toggle back into the high range mode of operation from the intermediate shift mode.

In some embodiments, transmission 30 is selectively reconfigured into the intermediate shift mode from one of the mid range mode and the high range mode, and then is selectively reconfigured back into the previous mode (e.g., mid range mode to intermediate shift mode to mid range mode, etc.). By way of example, transmission 30 may be reconfigured into the intermediate shift mode from the mid range mode in response to second electromagnetic device 50 and connecting shaft 36 having a speed differential below a threshold level. An operator may keep connecting shaft 36 operating at substantially the same speed for a period of time, driving output shaft 32 with first electromagnetic device 40 and/or second electromagnetic device 50, and then release the accelerator pedal whereby transmission 30 may be returned to the mid range mode.

Figure 9:
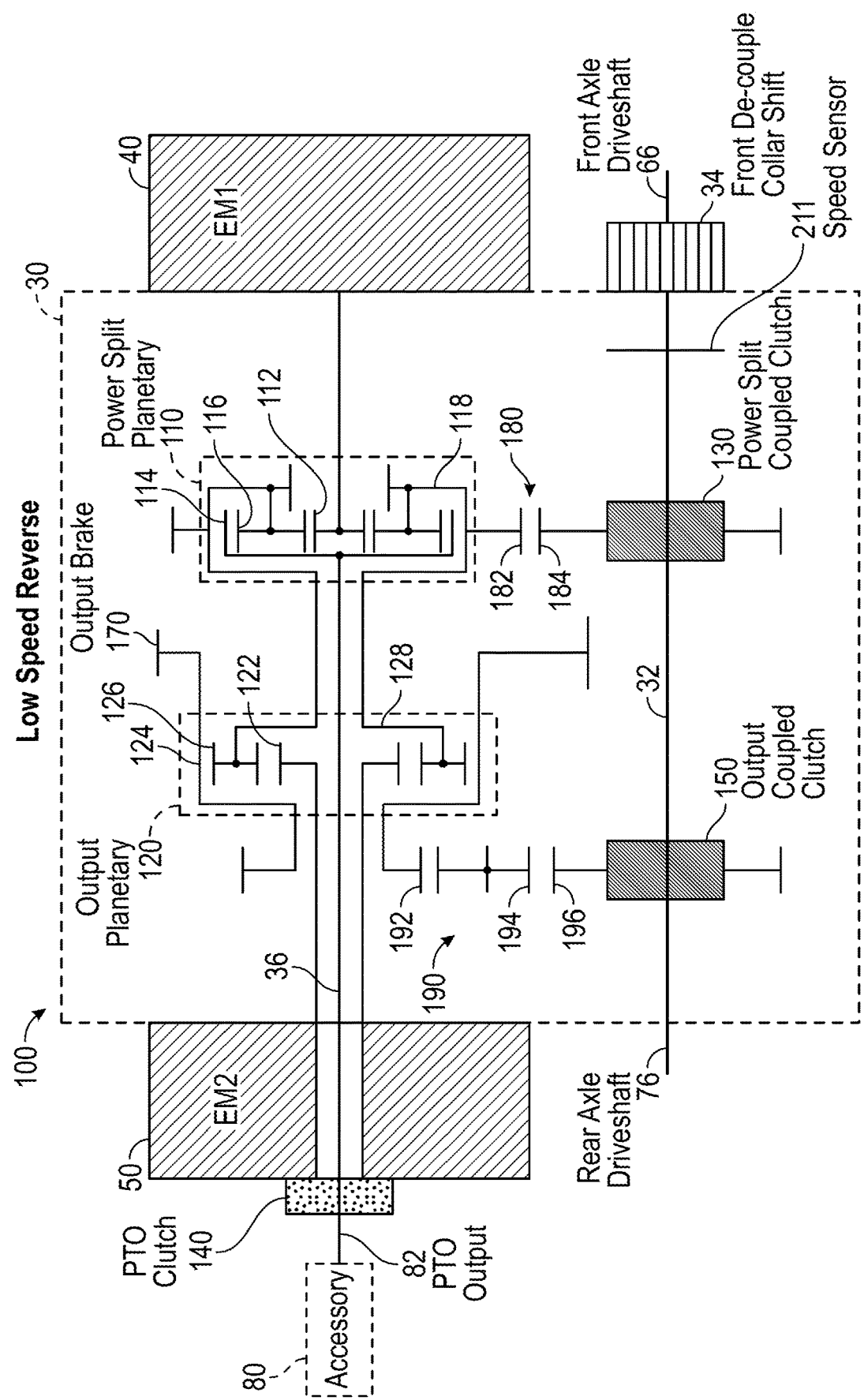
FIG. 9 is a detailed schematic view of the drive train of FIG. 2 configured in a low speed reverse mode of operation.

As shown in FIG. 9, transmission 30 is selectively reconfigured into a low speed reverse mode of operation. In one embodiment, second electromagnetic device 50 uses the electrical energy from electrical energy supply 52 and provides a rotational mechanical energy input to transmission 30 to drive at least one of tires 62 and tires 72 in a reverse direction (e.g., backwards, etc.) in the low speed reverse mode. The rotational mechanical energy input from second electromagnetic device 50 may additionally drive PTO output 82. In another embodiment, first electromagnetic device 40 uses the electrical energy from the electrical energy supply 52 and provides a rotational mechanical energy input to transmission 30 to drive at least one of tires 62 and tires 72 in a reverse direction and/or to drive PTO output 82 in the low speed reverse mode. In another embodiment, both first electromagnetic device 40 and second electromagnetic device provide a rotational mechanical energy input to transmission 30 in the low speed reverse mode. In still another alternative embodiment, one or both of first electromagnetic device 40 and second electromagnetic device 50 operate as a generator in the low speed reverse mode.

As shown in FIG. 9 and Table 1, power split coupled clutch 130 and output coupled clutch 150 are engaged when transmission 30 is configured in the low speed reverse mode. As shown in FIG. 9, the low speed reverse mode is substantially similar to the low range mode of FIG. 5 in that power split coupled clutch 130 and output coupled clutch 150 couple both gear set 180 and gear set 190 to output shaft 32. In the low speed reverse mode, first electromagnetic device 40 and/or second electromagnetic device 50 may provide a rotational mechanical energy input to transmission 30 in an opposite direction as compared to the low range mode of FIG. 5.

Figure 10:
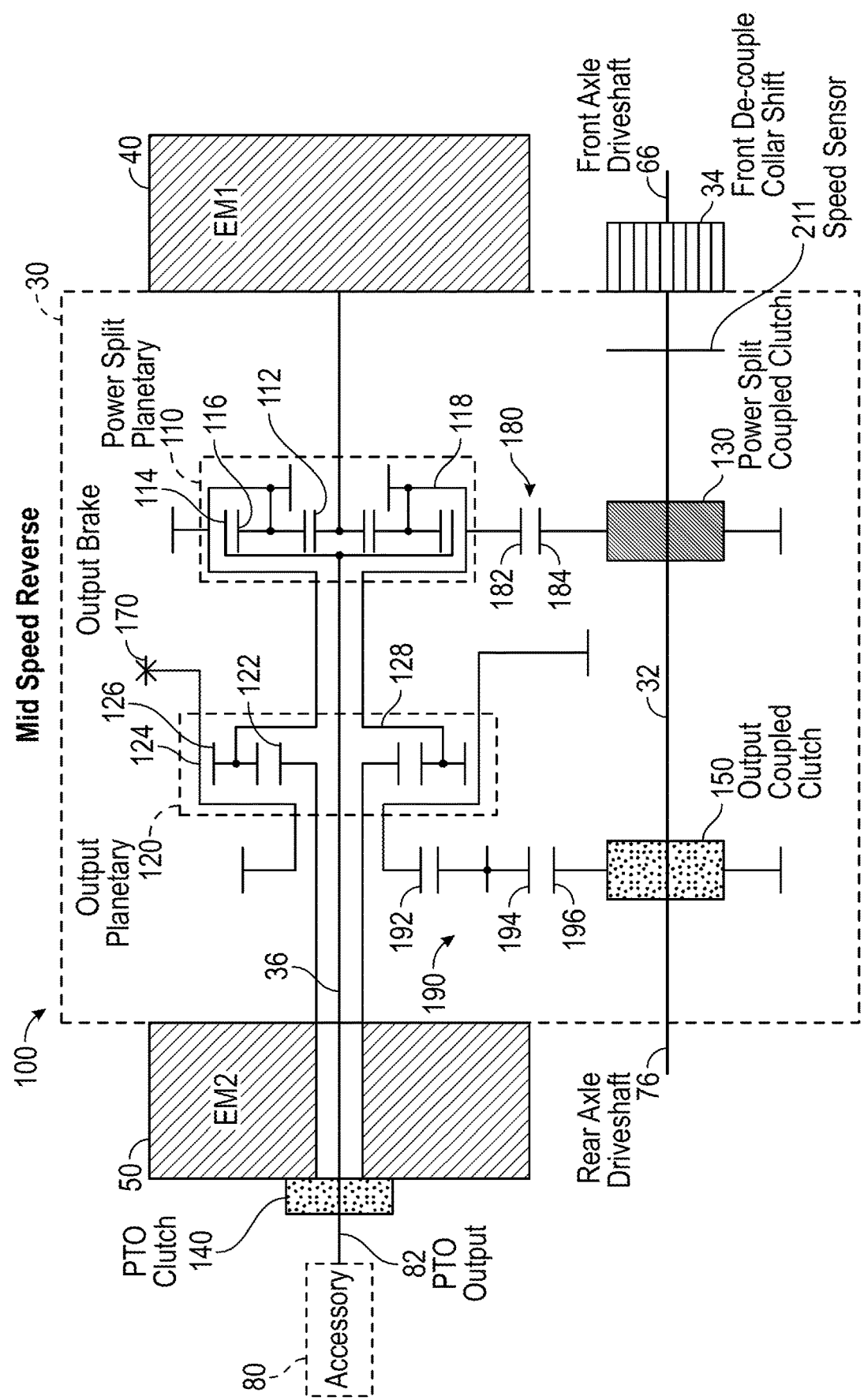
FIG. 10 is a detailed schematic view of the drive train of FIG. 2 configured in a mid speed reverse mode of operation.

As shown in FIG. 10, transmission 30 is selectively reconfigured into a mid speed reverse mode of operation such that transmission 30 allows for a moderate reverse output speed operation. In one embodiment, second electromagnetic device 50 uses the electrical energy from electrical energy supply 52 and provides a rotational mechanical energy input to transmission 30 to drive at least one of tires 62 and tires 72 in a reverse direction in the mid speed reverse mode. The rotational mechanical energy input from second electromagnetic device 50 may additionally drive PTO output 82. In another embodiment, first electromagnetic device 40 uses the electrical energy from electrical energy supply 52 and provides a rotational mechanical energy input to transmission 30 to drive at least one of tires 62 and tires 72 in a reverse direction and/or to drive PTO output 82 in the mid speed reverse mode. In another embodiment, both first electromagnetic device 40 and second electromagnetic device provide a rotational mechanical energy input to transmission 30 in the mid speed reverse mode. In still another alternative embodiment, one or both of first electromagnetic device 40 and second electromagnetic device 50 operate as a generator in the mid speed reverse mode.

As shown in FIG. 10 and Table 1, power split coupled clutch 130 and output brake 170 are engaged when transmission 30 is configured in the mid speed reverse mode. As shown in FIG. 10, the mid speed reverse mode is substantially similar to the mid range mode of FIG. 6 in that output brake 170 inhibits the rotation of gear set 190 (e.g., gear 192, gear 194, gear 196, etc.) and rotationally fixes ring gear 124. In the mid speed reverse mode, first electromagnetic device 40 and/or second electromagnetic device 50 may provide a rotational mechanical energy input to transmission 30 in an opposite direction as compared to the mid range mode of FIG. 6.

Figure 11:
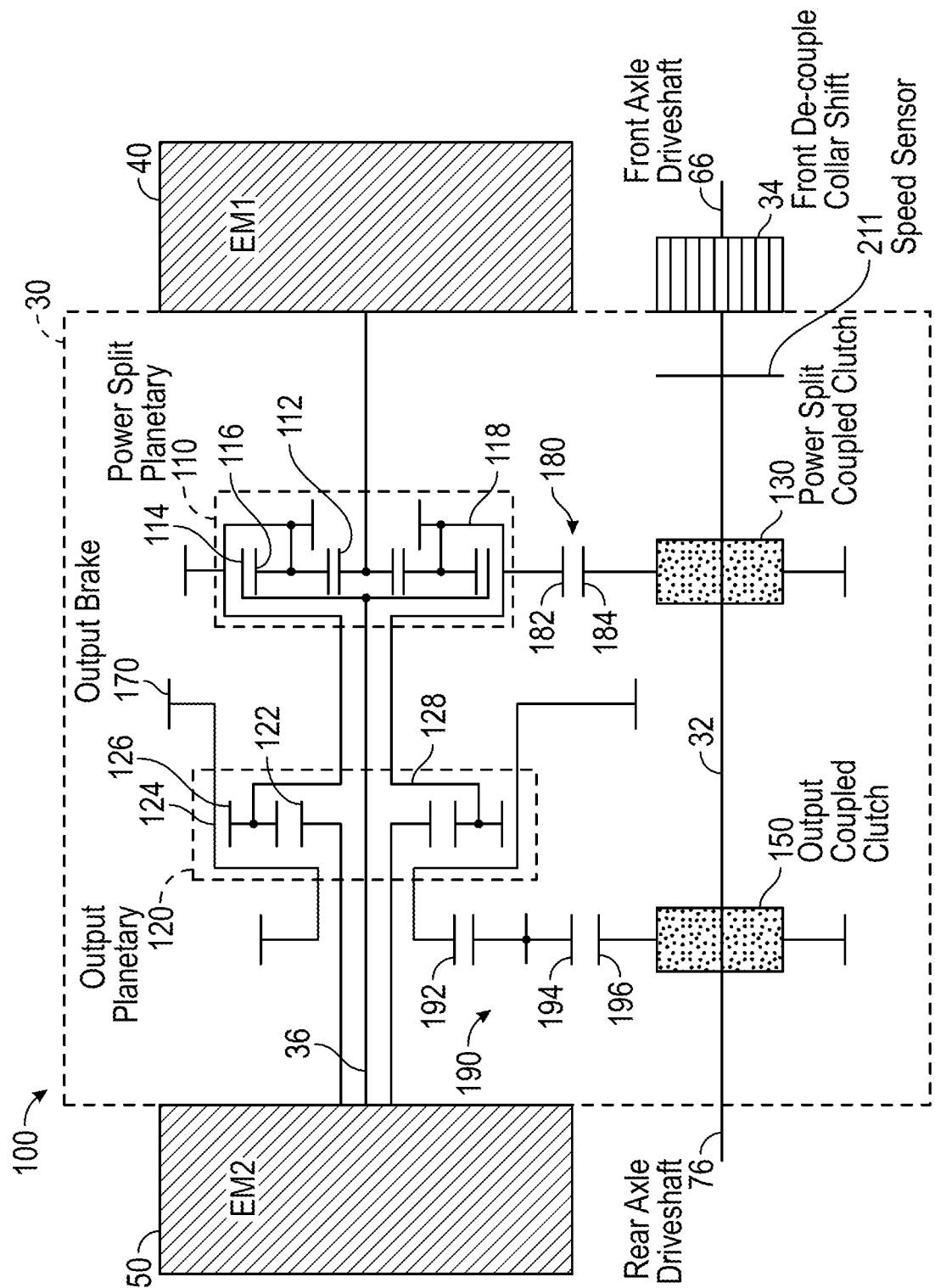
FIG. 11 is a detailed schematic view of a drive train for a vehicle, according to another exemplary embodiment.

Referring to FIG. 11, a drive system 300 is shown as an alternative embodiment to drive system 100. Drive system 300 is substantially similar to drive system 100 except accessory 80, PTO output 82, and PTO clutch 140 are omitted. Instead of connecting shaft 36 being selectively coupled to second electromagnetic device 50 through PTO clutch 140 as in drive system 100, connecting shaft 36 is directly fixedly coupled to second electromagnetic device 50 (e.g., to a shaft of second electromagnetic device 50). Accordingly, connecting shaft 36 and ring gear 114 are fixedly coupled to sun gear 122 (e.g., through second electromagnetic device 50).

Drive system 300 may be selectively reconfigured between a variety of different modes of operation in a similar manner to drive system 100. Specifically, drive system 300 may be selectively reconfigured by engaging or disengaging power split coupled clutch 130, output coupled clutch 150, and output brake 170. For the purposes of providing mechanical energy from first electromagnetic device 40 and second electromagnetic device 50 to output shaft 32, drive system 300 is similar to drive system 100 with PTO clutch 140 engaged. Accordingly, power split coupled clutch 130 may be engaged to configure drive system 300 into a mode of operation similar to the high range mode shown in FIG. 7. Power split coupled clutch 130 and output brake 170 may be engaged to configure drive system 300 into a mode of operation similar to the intermediate shift mode of operation shown in FIG. 8. In another mode of operation, output coupled clutch 150 may be engaged, and first electromagnetic device 40 and second electromagnetic device 50 may be used to drive output shaft 32. In yet another mode of operation, both power split coupled clutch 130 and output coupled clutch 150 may be engaged. In this mode, first electromagnetic device 40, second electromagnetic device 50, and output shaft 32 are coupled together through a fixed ratio.

Figure 12:
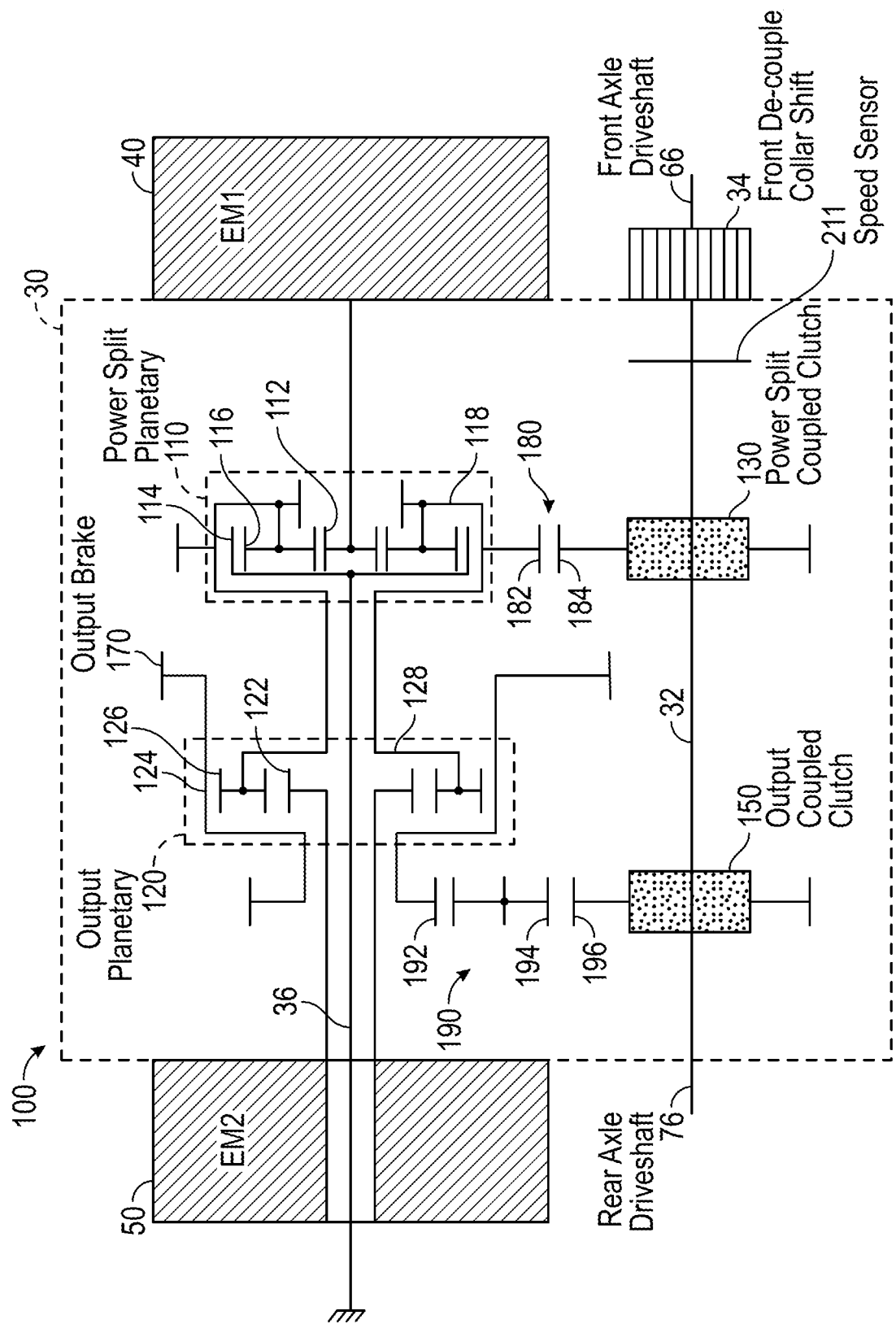
FIG. 12 is a detailed schematic view of a drive train for a vehicle, according to yet another exemplary embodiment.

Referring to FIG. 12, a drive system 400 is shown as another alternative embodiment to drive system 100. Drive system 400 is substantially similar to drive system 100 except accessory 80, PTO output 82, and PTO clutch 140 are omitted. Instead of connecting shaft 36 being selectively coupled to second electromagnetic device 50 with PTO clutch 140, connecting shaft 36 is fixed such that connecting shaft 36 is prevented from rotating (e.g., fixedly coupled to a housing of transmission 30 that is also coupled to the bodies of first electromagnetic device 40 and second electromagnetic device 50). Accordingly, both connecting shaft 36 and ring gear 114 are prevented from rotating.

Drive system 400 may be selectively reconfigured between a variety of different modes of operation in a similar manner to drive system 100. Specifically, drive system 400 may be selectively reconfigured by engaging or disengaging power split coupled clutch 130, output coupled clutch 150, and output brake 170. In drive system 400, first electromagnetic device 40 drives both carrier 118 and carrier 128 at a fixed ratio through sun gear 112 and the series of planetary gears 116. Accordingly, in any mode where power split coupled clutch 130 is engaged, first electromagnetic device 40 drives output shaft 32 at a fixed ratio. In these modes, second electromagnetic device 50 may or may not additionally supply mechanical energy to output shaft 32. In one mode of operation, output coupled clutch 150 is engaged, and first electromagnetic device 40 and second electromagnetic device 50 may be used to drive output shaft 32.

Figure 13:
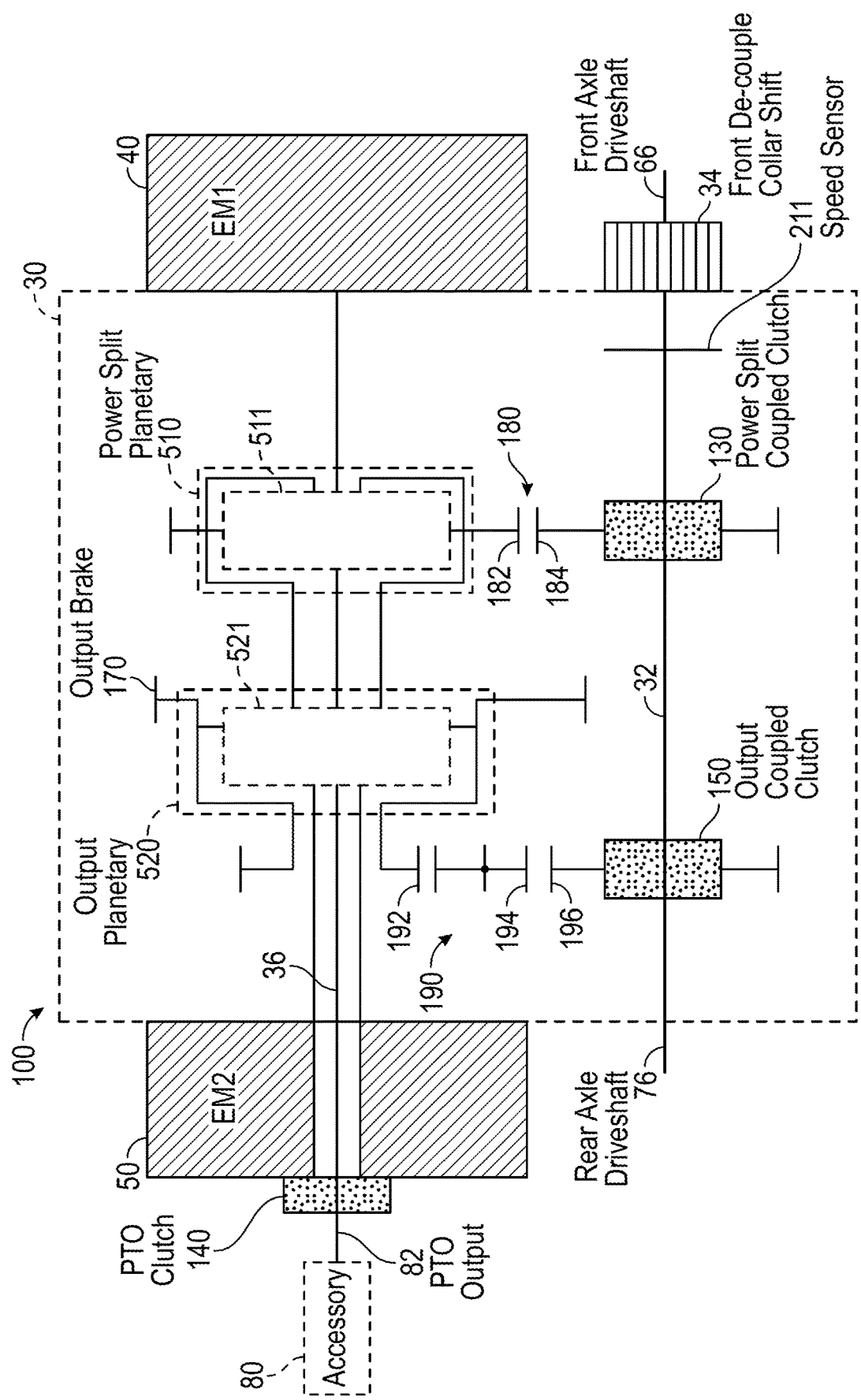
FIG. 13 is a detailed schematic view of a drive train for a vehicle, according to yet another exemplary embodiment.

Referring to FIG. 13, a drive system 500 is shown as yet another alternative embodiment to drive system 100. Drive system 500 is substantially similar to drive system 100 except power split planetary 110 and output planetary 120 are replaced with variable ratio power transmission devices, shown as power split variator 510 and output variator 520, respectively. In other embodiments, only one of power split planetary 110 and output planetary 120 are replaced. Power split variator 510 and output variator 520 are each configured to vary a ratio (e.g., a torque ratio, a gear ratio, a speed ratio, etc.) between an input to the variator and an output from the variator. Power split variator 510 and output variator 520 may have various arrangements (e.g., an epicyclic or planetary arrangement, a radially offset arrangement, etc.). Power split variator 510 and output variator 520 may utilize various types of variator configurations. By way of example, power split variator 510 and output variator 520 may belt and/or chain variators (e.g., include one or more belts or chains rotationally coupling variable diameter pulleys, etc.). In such an example, varying the pulley diameters may adjust the relative speeds between various components within power split variator 510. Such a belt variator and/or a chain variator may be a planetary device.

Figure 14:
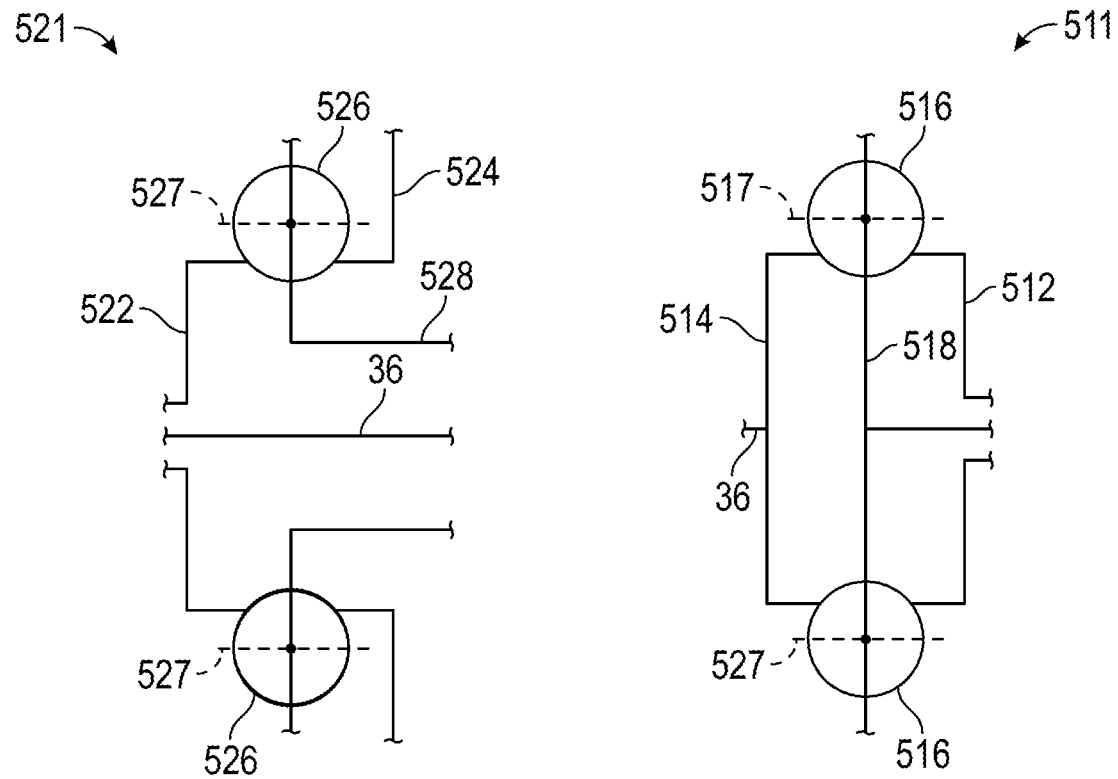
FIG. 14 is a detailed schematic view of variators of the drive train of FIG. 13, according to an exemplary embodiment.
Figure 15:
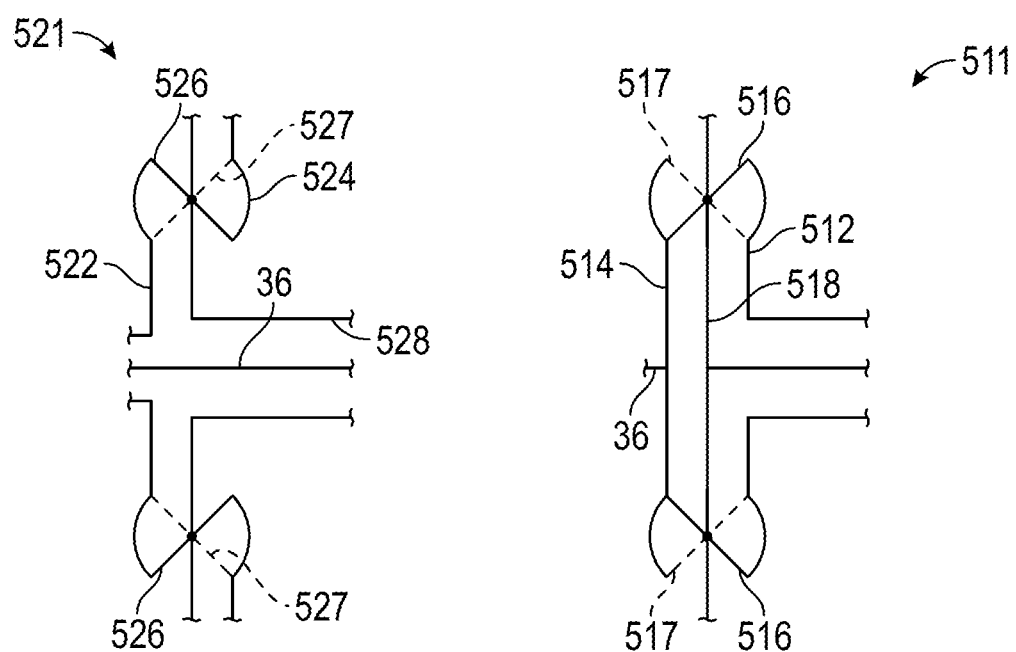
FIG. 15 is a detailed schematic view of variators of the drive train of FIG. 13, according to another exemplary embodiment.

As shown in FIG. 13, power split variator 510 includes an inner portion 511 and output variator 520 includes an inner portion 521. Inner portion 511 and inner portion 521 are shown according to various exemplary embodiments in FIGS. 14 and 15. In FIGS. 14 and 15, power split variator 510 and output variator 520 are epicyclic or planetary devices. Power split variator 510 includes a first rotatable portion 512, a second rotatable portion 514, and one or more adjustable members or connecting members 516 each configured to rotate about a corresponding axis 517. Connecting members 516 engage (e.g., rotationally) both first rotatable portion 512 and second rotatable portion 514, thereby coupling first rotatable portion 512 to second rotatable portion 514, according to an exemplary embodiment. A carrier 518 rotationally supports connecting members 516 such that each connecting member 516 rotates relative to carrier 518 about corresponding axis 517. In some embodiments, connecting members 516 are selectively repositionable such that axes 517 rotate relative to carrier 518. As the orientations of connecting members 516 change relative to carrier 518, connecting members 516 may engage first rotatable portion 512 and second rotatable portion 514 at different locations, varying the speed ratios between first rotatable portion 512, second rotatable portion 514, and carrier 518.

Output variator 520 includes a first rotatable portion 522, a second rotatable portion 524, and one or more adjustable members or connecting members 526 each configured to rotate about a corresponding axis 527. Connecting members 526 engage (e.g., rotationally) both first rotatable portion 522 and second rotatable portion 524, thereby coupling first rotatable portion 522 to second rotatable portion 524, according to an exemplary embodiment. A carrier 528 rotationally supports connecting members 526 such that each connecting member 526 rotates relative to carrier 528 about corresponding axis 527. In some embodiments, connecting members 526 are selectively repositionable such that axes 527 rotate relative to carrier 528. As the orientations of connecting members 526 change relative to carrier 528, connecting members 526 may engage first rotatable portion 522 and second rotatable portion 524 at different locations, varying the speed ratios between first rotatable portion 522, second rotatable portion 524, and carrier 528.

In the embodiment shown in FIG. 14, power split variator 510 and output variator 520 are epicyclic or planetary devices configured as friction ball variators. Although power split variator 510 is described hereinafter, it should be understood that a similar description applies to the corresponding components of output variator 520 (e.g., connecting members 516 corresponding to connecting members 526, etc.). In this embodiment, connecting members 516 are balls (e.g., spheres, etc.) that are rotatable relative to carrier 518 about axes 517. In the embodiment shown in FIG. 14, power split variator 510 is shown to include two connecting members 516, however, power split variator 510 may include more or fewer connecting members 516 (e.g., 1, 3, 4, 10, etc.). First rotatable portion 512 and second rotatable portion 514 each include an engagement surface that extends along a circular path and is configured to engage connecting members 516 (e.g., through friction, etc.). Accordingly, first rotatable portion 512 is rotationally engaged with second rotatable portion 514 through connecting members 516. Each connecting member 516 is configured to rotate relative to carrier 518 about an axis 517 in response to a rotational mechanical energy input (e.g., through first rotatable portion 512, through second rotatable portion 514, through carrier 518, etc.).

In some embodiments, axes 517 are fixed (e.g., permanently, selectively, etc.) relative to carrier 518. In other embodiments, to facilitate varying speed ratios between inputs to power split variator 510 and outputs from power split variator 510, each axis 517 is rotatable relative to carrier 518 (e.g., such that axis 517 rotates about an axis extending perpendicular to the plane of FIG. 14). Connecting members 516 may have a curved profile such that rotating axes 517 of connecting members 516 varies the ratios between the speed of first rotatable portion 512, the speed of second rotatable portion 514, and the speed of carrier 518. Rotating axis 517 corresponding to one of the connecting members 516 in a first direction both (a) reduces the distance between that axis 517 and the point where first rotatable portion 512 engages that connecting member 516 and (b) increases the distance between that axis 517 and the point where second rotatable portion 514 engages that connecting member 516. In one such arrangement, with carrier 518 held fixed, first rotatable portion 512 rotates more slowly than second rotatable portion 514. Rotating axis 517 in the opposite direction may have the opposite effect. In some embodiments, axes 517 are rotationally coupled such that they rotate in unison.

In the embodiment shown in FIG. 15, power split variator 510 and output variator 520 are epicyclic or planetary devices configured as toroidal variators. Although power split variator 510 is described hereinafter, it should be understood that a similar description applies to the corresponding components of output variator 520 (e.g., connecting members 516 corresponding to connecting members 526, etc.). In this embodiment, each connecting member 516 is a wheel or disc that is rotatable relative to carrier 518. In the embodiment shown in FIG. 15, power split variator 510 is shown to include two connecting members 516, however, power split variator 510 may include more or fewer connecting members 516 (e.g., 1, 3, 4, 10, etc.). First rotatable portion 512 and second rotatable portion 514 each include a toroidal engagement surface that is configured to engage connecting members 516 (e.g., through friction, etc.). Accordingly, first rotatable portion 512 is rotationally engaged with second rotatable portion 514 through connecting members 516. Each connecting member 516 is configured to rotate relative to carrier 518 about an axis 517 in response to a rotational mechanical energy input (e.g., through first rotatable portion 512, through second rotatable portion 514, through carrier 518, etc.).

In some embodiments, axes 517 are fixed relative to carrier 518. In other embodiments, to facilitate varying speed ratios between inputs to power split variator 510 and outputs from power split variator 510, each axis 517 is rotatable relative to carrier 518 (e.g., such that axis 517 rotates about an axis extending perpendicular to the plane of FIG. 15). To facilitate continuous engagement between connecting members 516, first rotatable portion 512, and second rotatable portion 514 as axis 517 rotates, the toroidal engagement surfaces may be concave with a constant radius cross sectional curvature. In such embodiments, rotating axes 517 varies the ratios between the speed of first rotatable portion 512, the speed of second rotatable portion 514, and the speed of carrier 518. Rotating axis 517 corresponding to one of connecting members 516 in a first direction both (a) increases the radius between the axis of rotation of first rotatable portion 512 and the point where that connecting member 516 engages first rotatable portion 512 and (b) decreases the radius between the axis of rotation of second rotatable portion 514 and the point where that connecting member 516 engages second rotatable portion 514. In one such arrangement, with carrier 518 held fixed, first rotatable portion 512 rotates more slowly than second rotatable portion 514. Rotating axis 517 in the opposite direction has the opposite effect. In some embodiments, axes 517 are rotationally coupled such that they rotate in unison.

As shown in FIG. 3, power split variator 510 and output variator 520 each include an adjustment mechanism or actuator, shown as variator adjustment mechanism 550. Variator adjustment mechanisms 550 are configured to rotate axes 517 relative to carrier 518, rotate axes 527 relative to carrier 528, or otherwise vary speed ratios of power split variator 510 and output variator 520. Variator adjustment mechanism 550 may be a hydraulic actuator, a pneumatic actuator, an electric motor, or another type of actuator that is controlled by another component (e.g., controller 210). By way of example, controller 210 may control variator adjustment mechanism 550 to control the speed of output shaft 32 and/or PTO output 82. Alternatively, variator adjustment mechanism 550 may be controlled passively (e.g., using a flyweight system). By way of example, variator adjustment mechanism 550 may include a spring loaded flyweight coupled to a component of power split variator 510 (e.g., carrier 518) such that variator adjustment mechanism 550 varies the orientation of axes 517 based on a rotational speed of the component. In other embodiments, axes 517 are fixed relative to carrier 518, and variator adjustment mechanism 550 is omitted.

Figure 16:
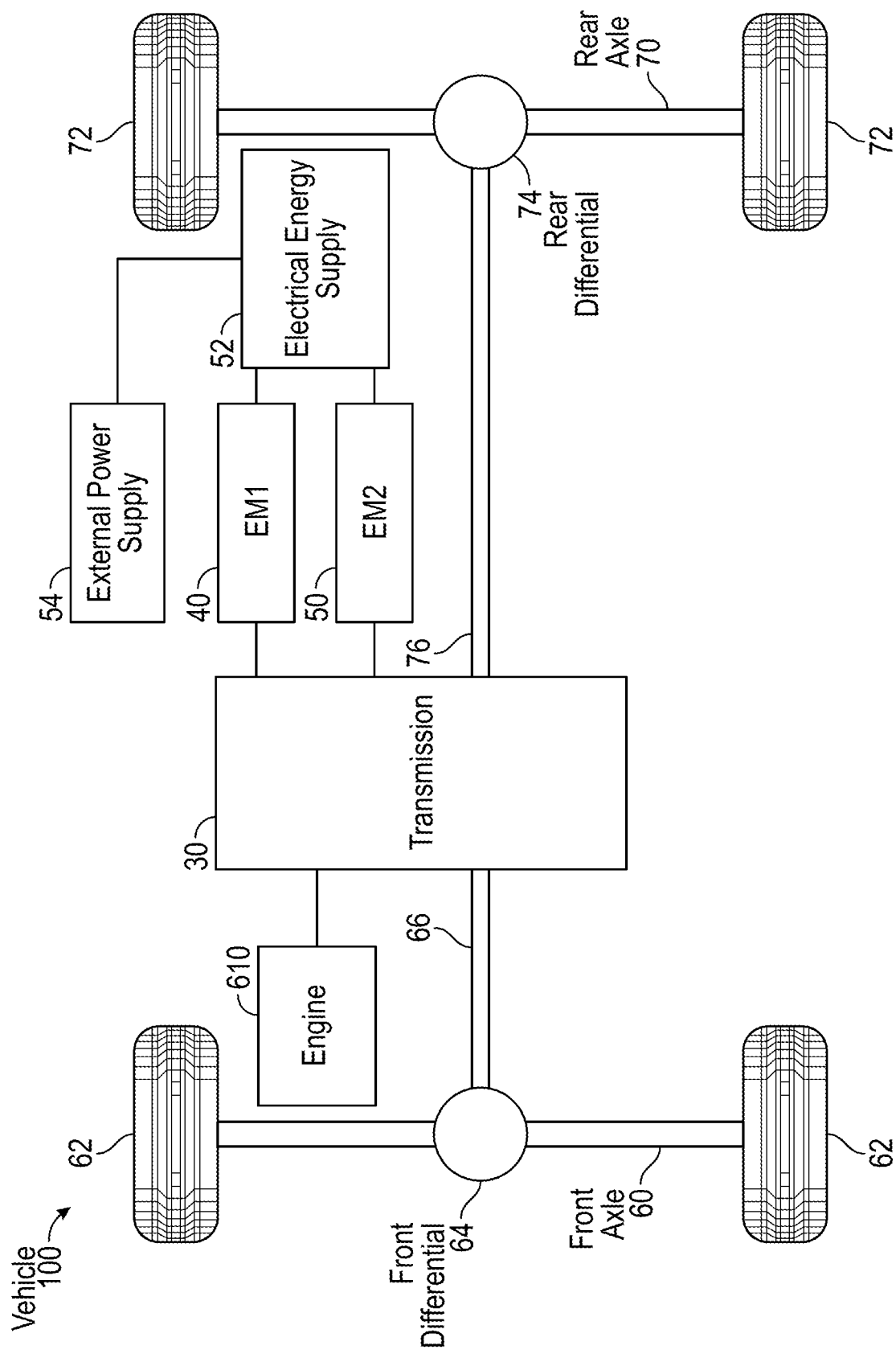
FIG. 16 is a schematic view of a drive train for a vehicle, according to another exemplary embodiment.

Referring to FIG. 16, a vehicle 600 is shown as an alternative embodiment to vehicle 10. Vehicle 600 is substantially similar to vehicle 10 except vehicle 600 includes a primary driver, shown as engine 610, in place of accessory 80. Engine 610 may be an internal combustion engine configured to be powered by at least one of gasoline, natural gas, and diesel fuel. Engine 610 is configured to consume fuel from a fuel tank onboard vehicle 600 and provide a rotational mechanical energy input to transmission 30 through PTO output shaft 82 and/or connecting shaft 36. In a further alternative embodiment, both engine 610 and accessory 80 are included. By way of example, accessory 80 may be radially offset from PTO output 82 and rotationally coupled to PTO output 82 by one or more gears and/or belts.

Vehicle 600 may operate in a variety of different configurations. In each configuration, engine 610 may provide rotational mechanical energy to transmission 30 to drive vehicle 600 (e.g., through output shaft 32) and/or accessory 80 or may not provide rotational mechanical energy (e.g., when operating at idle, when turned off, etc.). First electromagnetic device 40 and second electromagnetic device 50 may provide rotational mechanical energy to transmission 30 to drive vehicle 600 and/or accessory 80, may be turned off (e.g., in a free spinning or stationary configuration), or may receive rotational mechanical energy and generate electrical energy to charge electrical energy supply 52.

By way of example, vehicle 600 may operate in an electric only configuration where first electromagnetic device 40 and/or second electromagnetic device 50 consume electrical energy from electrical energy supply 52 and provide rotational mechanical energy to drive vehicle 600 while engine 610 does not provide rotational mechanical energy to transmission 30. By way of another example, vehicle 600 may operate in an engine only configuration where engine 610 provides a rotational mechanical energy input to transmission 30 to drive at least one of vehicle 600, first electromagnetic device 40, and second electromagnetic device 50 while first electromagnetic device 40 and second electromagnetic device 50 do not provide rotational mechanical energy to transmission 30. In the engine only configuration, first electromagnetic device 40 and/or second electromagnetic device 50 may be configured to use rotational mechanical energy from engine 610 and generate electrical energy to charge electrical energy supply 52. In yet another embodiment, vehicle 600 may operate in a hybrid configuration where engine 610 and at least one of first electromagnetic device 40 and second electromagnetic device 50 provide a rotational mechanical energy input to transmission 30 to drive at least one of vehicle 600, first electromagnetic device 40, and second electromagnetic device 50. In the hybrid configuration, first electromagnetic device 40 and/or second electromagnetic device 50 may be configured to use rotational mechanical energy from engine 610 and/or one of the electromagnetic devices and generate electrical energy to charge electrical energy supply 52.

Vehicle 600 may be configured to switch between the different configurations depending on the operating conditions of vehicle 600 (e.g., the charge of electrical energy supply 52, an amount of fuel remaining in the fuel tank, etc.) and/or in response to an operator input (e.g., a command to change to a different configuration). By way of example, an operator may charge electrical energy supply 52 with external power supply 54 prior to operation of vehicle 600. Initially, vehicle 600 may operate in the electric only configuration, beneficially reducing emissions of vehicle 600. In response to a command from an operator or to the level of charge of electrical energy supply 52 falling below a threshold level, a controller of vehicle 600 (e.g., controller 210) may be configured to switch vehicle 600 into the engine only configuration or the hybrid configuration. These configurations facilitate consuming fuel to extend the operational range of vehicle 600 beyond that provided by a single charge of electrical energy supply 52. Rotational mechanical energy from engine 610 may additionally be used to drive first electromagnetic device 40 and/or second electromagnetic device 50 in order to recharge electrical energy supply 52. Subsequently, the controller of vehicle 600 may reconfigure vehicle 600 back into the electric only configuration (e.g., in response to an operator input or in response to the charge of electrical energy supply 52 exceeding a second threshold level, etc.). In other embodiments that do not include an engine, such as vehicle 10 of FIG. 2, the vehicle may constantly be configured in an electric only configuration.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A drive system for a vehicle, comprising:
   a first electrical machine;
   a second electrical machine;
   a transmission, comprising:
      a first gear set including a first sun gear, a first ring gear, a first plurality of planetary gears coupling the first sun gear to the first ring gear, and a first carrier rotationally supporting the first plurality of planetary gears, wherein the first gear set is coupled to the first electrical machine;
      a second gear set including a second sun gear, a second ring gear, a second plurality of planetary gears coupling the second sun gear to the second ring gear, and a second carrier rotationally supporting the second plurality of planetary gears, wherein the first carrier is directly coupled to the second carrier and wherein the second gear set is coupled to the second electrical machine;
      a connecting shaft coupled to the ring gear of the first gear set and at least selectively coupled to the second electrical machine;
   a driveshaft configured to transport power from the first electrical machine and the second electrical machine to a tractive element of the vehicle; and
   a clutch selectively rotationally coupling the first carrier and the second carrier to the driveshaft when engaged; and
   an electrical energy supply configured to provide electrical energy to the first electrical machine and the second electrical machine, wherein the drive system is at least selectively operable in an electric only configuration whereby the electrical energy supply provides electrical energy to at least one of the first electrical machine and the second electrical machine to drive at least one of the connecting shaft and the driveshaft without a mechanical energy input to the transmission from an engine.

2. The drive system of claim 1, further comprising a power takeoff output directly coupled to the connecting shaft, wherein the power takeoff output is configured to transfer rotational mechanical energy between the connecting shaft and an accessory.

3. The drive system of claim 2, wherein the first electrical machine is directly coupled to the first sun gear, and wherein the second electrical machine is directly coupled to the second sun gear.

4. A drive system for a vehicle, comprising:
   a first electrical machine;
   a second electrical machine;
   a transmission, comprising:
      a first gear set including a first sun gear, a first ring gear, a first plurality of planetary gears coupling the first sun gear to the first ring gear, and a first carrier rotationally supporting the first plurality of planetary gears, wherein the first gear set is coupled to the first electrical machine;
      a second gear set including a second sun gear, a second ring gear, a second plurality of planetary gears coupling the second sun gear to the second ring gear, and a second carrier rotationally supporting the second plurality of planetary gears, wherein the first carrier is directly coupled to the second carrier and wherein the second gear set is coupled to the second electrical machine;
      a connecting shaft coupled to the first ring gear of the first gear set, wherein the connecting shaft is fixed such that the first ring gear of the first gear set is prevented from rotating;
   a driveshaft configured to transport power from the first electrical machine and the second electrical machine to a tractive element of the vehicle; and
   a clutch selectively rotationally coupling the first carrier and the second carrier to the driveshaft when engaged; and
   an electrical energy supply configured to provide electrical energy to the first electrical machine and the second electrical machine, wherein the drive system is at least selectively operable in an electric only configuration whereby the electrical energy supply provides electrical energy to at least one of the first electrical machine and the second electrical machine to drive at least one of the connecting shaft and the driveshaft without a mechanical energy input to the transmission from an engine.

5. A drive system for a vehicle, comprising:
   a first electrical machine;
   a second electrical machine;
   a transmission, comprising:
      a first gear set including a first sun gear, a first ring gear, a first plurality of planetary gears coupling the first sun gear to the first ring gear, and a first carrier rotationally supporting the first plurality of planetary gears, wherein the first gear set is coupled to the first electrical machine;
      a second gear set including a second sun gear, a second ring gear, a second plurality of planetary gears coupling the second sun gear to the second ring gear, and a second carrier rotationally supporting the second plurality of planetary gears, wherein the first carrier is directly coupled to the second carrier and wherein the second gear set is coupled to the second electrical machine;
      a connecting shaft coupled to the first gear set;
   a driveshaft configured to transport power from the first electrical machine and the second electrical machine to a tractive element of the vehicle; and a clutch selectively rotationally coupling the first carrier and the second carrier to the driveshaft when engaged; and an electrical energy supply configured to provide electrical energy to the first electrical machine and the second electrical machine, wherein the drive system is at least selectively operable in an electric only configuration whereby the electrical energy supply provides electrical energy to at least one of the first electrical machine and the second electrical machine to drive at least one of the connecting shaft, wherein the drive system does not include an engine configured to provide a mechanical energy input into the transmission.

6. A drive system for a vehicle, comprising:
a first electrical machine;
a second electrical machine;
a transmission, comprising:
  a first gear set including a first sun gear, a first ring gear, a first plurality of planetary gears coupling the first sun gear to the first ring gear, and a first carrier rotationally supporting the first plurality of planetary gears, wherein the first gear set is coupled to the first electrical machine;
  a second gear set including a second sun gear, a second ring gear, a second plurality of planetary gears coupling the second sun gear to the second ring gear, and a second carrier rotationally supporting the second plurality of planetary gears, wherein the first carrier is directly coupled to the second carrier and wherein the second gear set is coupled to the second electrical machine;
  a connecting shaft coupled to the first gear set;
  a driveshaft configured to transport power from the first electrical machine and the second electrical machine to a tractive element of the vehicle;
  a clutch selectively rotationally coupling the first carrier and the second carrier to the driveshaft when engaged; and
  at least one of:
    a second clutch selectively rotationally coupling the connecting shaft to the second electrical machine when engaged;
    a third clutch selectively rotationally coupling the second gear set to the driveshaft when engaged; and
    a brake positioned to selectively limit a rotational movement of the second ring gear; and
an electrical energy supply configured to provide electrical energy to the first electrical machine and the second electrical machine, wherein the drive system is at least selectively operable in an electric only configuration whereby the electrical energy supply provides electrical energy to at least one of the first electrical machine and the second electrical machine to drive at least one of the connecting shaft and the driveshaft without a mechanical energy input to the transmission from an engine.

7. The drive system of claim 6, wherein the transmission comprises the second clutch selectively rotationally coupling the connecting shaft to the second electrical machine when engaged.

8. The drive system of claim 6, wherein the transmission comprises the third clutch selectively rotationally coupling the second gear set to the driveshaft when engaged.

9. The drive system of claim 6, wherein the transmission comprises the brake positioned to selectively limit the rotational movement of the second ring gear.

10. A drive system for a vehicle, comprising:
a transmission, comprising:
  a first planetary device;
  a second planetary device directly coupled to the first planetary device;
  a power takeoff output coupled to the first planetary device through a connecting shaft, wherein the first planetary device, the second planetary device, and the connecting shaft are radially aligned, and wherein the power takeoff output is configured to transfer rotational mechanical energy between the connecting shaft and an accessory; and
  an output at least selectively coupled to the first planetary device and the second planetary device, wherein the output is radially offset from the first planetary device, the second planetary device, and the connecting shaft;
a first electromagnetic device coupled to the first planetary device;
a second electromagnetic device coupled to the second planetary device and at least selectively rotationally engaged with the connecting shaft; and
an electrical energy supply configured to provide electrical energy to the first electromagnetic device and the second electromagnetic device, wherein the drive system is at least selectively operable in an electric only configuration in which the electrical energy supply provides electrical energy to at least one of the first electromagnetic device and the second electromagnetic device to drive at least one of the power takeoff output and the output without a mechanical energy input to the transmission from an engine.

11. The drive system of claim 10, wherein the drive system does not include an engine configured to provide a mechanical energy input into the transmission.

12. A drive system for a vehicle, comprising:
a transmission, comprising:
  a first planetary device;
  a second planetary device directly coupled to the first planetary device;
  a power takeoff output coupled to the first planetary device through a connecting shaft, wherein the first planetary device, the second planetary device, and the connecting shaft are radially aligned, and wherein the power takeoff output is configured to transfer rotational mechanical energy between the connecting shaft and an accessory; and
  an output at least selectively coupled to the first planetary device and the second planetary device, wherein the output is radially offset from the first planetary device, the second planetary device, and the connecting shaft;
a first electromagnetic device coupled to the first planetary device; and
a second electromagnetic device coupled to the second planetary device and at least selectively rotationally engaged with the connecting shaft,
wherein the first electromagnetic device includes a first shaft and the second electromagnetic device includes a second shaft, wherein the first shaft and the second shaft are radially aligned with the first planetary device, the second planetary device, and the connecting shaft.

13. A drive system for a vehicle, comprising:
a transmission, comprising:
  a first planetary device;
  a second planetary device directly coupled to the first planetary device;

a power takeoff output coupled to the first planetary device through a connecting shaft, wherein the first planetary device, the second planetary device, and the connecting shaft are radially aligned, and wherein the power takeoff output is configured to transfer rotational mechanical energy between the connecting shaft and an accessory; and an output at least selectively coupled to the first planetary device and the second planetary device, wherein the output is radially offset from the first planetary device, the second planetary device, and the connecting shaft;

a first electromagnetic device coupled to the first planetary device; and a second electromagnetic device coupled to the second planetary device and at least selectively rotationally engaged with the connecting shaft, wherein the connecting shaft extends through the second electromagnetic device and through the second planetary device to the first planetary device.

14. A drive system for a vehicle, comprising:
a transmission, comprising:
   a first planetary device;
   a second planetary device directly coupled to the first planetary device;
   a power takeoff output coupled to the first planetary device through a connecting shaft, wherein the first planetary device, the second planetary device, and the connecting shaft are radially aligned, and wherein the power takeoff output is configured to transfer rotational mechanical energy between the connecting shaft and an accessory; and
   an output at least selectively coupled to the first planetary device and the second planetary device, wherein the output is radially offset from the first planetary device, the second planetary device, and the connecting shaft;
   a first electromagnetic device coupled to the first planetary device; and
   a second electromagnetic device coupled to the second planetary device and at least selectively rotationally engaged with the connecting shaft,
wherein the first planetary device and the second planetary device are disposed between the first electromagnetic device and the second electromagnetic device.

15. A drive system for a vehicle, comprising:
a transmission, comprising:
   a first planetary device;
   a second planetary device directly coupled to the first planetary device;
   a power takeoff output coupled to the first planetary device through a connecting shaft, wherein the first planetary device, the second planetary device, and the connecting shaft are radially aligned, and wherein the power takeoff output is configured to transfer rotational mechanical energy between the connecting shaft and an accessory; and
   an output at least selectively coupled to the first planetary device and the second planetary device, wherein the output is radially offset from the first planetary device, the second planetary device, and the connecting shaft;
   a first electromagnetic device coupled to the first planetary device; and
   a second electromagnetic device coupled to the second planetary device and at least selectively rotationally engaged with the connecting shaft,
wherein the drive system is selectively reconfigurable into:
   a first mode in which the output is coupled to the first planetary device and the second planetary device;
   a second mode in which the output is coupled to the first planetary device and a rotational movement of the second planetary device is limited; and
   a third mode in which the output is coupled to the first planetary device and the second electromagnetic device is rotationally engaged with the connecting shaft.

16. A method of operating a drive system for a vehicle in an electric only configuration, the method comprising:
providing, by an electrical energy supply disposed onboard the vehicle, electrical energy to both (a) a first electrical machine coupled to a first planetary device of a transmission and (b) a second electrical machine coupled to a second planetary device of the transmission without providing a rotational mechanical energy input to the transmission from an engine, wherein the first planetary device is directly coupled to the second planetary device; and
driving, by at least one of the first electrical machine and the second electrical machine, a power takeoff output coupled to an accessory, wherein the power takeoff output is coupled to the first planetary device with a connecting shaft that extends through the second planetary device and the second electrical machine.

17. The method of claim 16, further comprising:
operating a clutch, wherein selectively engaging and disengaging the clutch changes a configuration of the transmission, and wherein operating the clutch selectively couples at least one of the first planetary device and the second planetary device to a tractive element of the vehicle; and
driving, by at least one of the first electrical machine and the second electrical machine, the tractive element.

18. The method of claim 17, further comprising operating a second clutch, wherein selectively engaging and disengaging the second clutch changes the configuration of the transmission, and wherein operating the second clutch selectively couples the second electrical machine to the connecting shaft.

* * * * *